(12) United States Patent
Gleckman

(10) Patent No.: US 7,277,641 B1
(45) Date of Patent: Oct. 2, 2007

(54) MULTIPLE ACCESS SPACE COMMUNICATIONS OPTICAL SYSTEM USING A COMMON TELESCOPE APERTURE

(75) Inventor: Philip Gleckman, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 861 days.

(21) Appl. No.: 10/431,277

(22) Filed: May 6, 2003

(51) Int. Cl.
 *H04B 10/00* (2006.01)
(52) U.S. Cl. .................. 398/128; 398/152; 398/85; 398/96
(58) Field of Classification Search ........ 398/118–131, 398/96, 152
See application file for complete search history.

(56) References Cited

U.S. PATENT DOCUMENTS

| | | | |
|---|---|---|---|
| 3,700,309 A | 10/1972 | Skolnick et al. ............ 350/163 |
| 4,025,194 A | 5/1977 | Teppo ............................ 356/5 |
| 4,872,015 A | 10/1989 | Rosen ......................... 342/353 |
| 5,030,004 A | 7/1991 | Grant et al. ................. 356/152 |
| 5,062,150 A | 10/1991 | Swanson et al. ........... 359/152 |
| 5,090,795 A | 2/1992 | O'Meara et al. ............ 359/240 |
| 5,119,225 A | 6/1992 | Grant et al. ................. 359/172 |
| 5,218,467 A | 6/1993 | Ross et al. .................. 359/172 |
| 5,282,073 A | 1/1994 | Defour et al. ............... 359/159 |
| 5,347,387 A | 9/1994 | Rice |
| 5,475,520 A | 12/1995 | Wissinger .................... 359/172 |
| 5,530,577 A | 6/1996 | Orino et al. ................. 359/152 |
| 5,627,669 A | 5/1997 | Orino et al. |
| 5,659,413 A | 8/1997 | Carlson ........................ 359/172 |
| 5,710,652 A | 1/1998 | Bloom et al. ................ 359/152 |
| 5,726,786 A | 3/1998 | Heflinger .................... 359/152 |
| 5,734,504 A | 3/1998 | Billman ....................... 359/618 |
| 5,777,768 A | 7/1998 | Korevaar ..................... 359/172 |
| 5,898,529 A | 4/1999 | Meyer et al. ................ 359/853 |
| 5,923,452 A | 7/1999 | Carlson ........................ 359/172 |
| 5,974,074 A | 10/1999 | Mayor et al. ................ 372/106 |
| 5,978,121 A | 11/1999 | Fischer et al. .............. 359/156 |
| 6,091,528 A | 7/2000 | Kanda ......................... 359/159 |
| 6,268,944 B1 | 7/2001 | Szapiel ........................ 359/159 |
| 6,297,897 B1 | 10/2001 | Czichy et al. ............... 359/172 |
| 6,301,037 B1 | 10/2001 | Fischer et al. .............. 359/180 |
| 6,304,354 B2 | 10/2001 | Carlson ........................ 359/172 |

(Continued)

OTHER PUBLICATIONS

Gurantz, I., et al., "Multiple-Access Communication Using Coded Pulse Interval Modulation," pp. 14.4.1-14.4.5, IEEE, 1980.

(Continued)

*Primary Examiner*—Agustin Bello
(74) *Attorney, Agent, or Firm*—Sheridan Ross PC

(57) ABSTRACT

The present invention relates to a multiple access space laser communications optical system. According to the present invention, multiple optical signals containing a number of channels are simultaneously received and demultiplexed at a multiple access communication device. Separate communication signals may be multiplexed by the multiple access communication device, and transmitted through the same or a different telescope optical assembly used to receive communication signals. Double-pass reflection is used to selectively polarize signals and to ensure that signals are substantial normal to optical bandpass filters, to avoid large shifts in the wavelengths transmitted by the optical bandpass filters. The system is capable of providing discrete communications with a number of communication endpoints, regardless of where the communication endpoints are located within the field of view of the telescope optical assembly.

30 Claims, 13 Drawing Sheets

U.S. PATENT DOCUMENTS

| | | |
|---|---|---|
| 6,327,063 B1 | 12/2001 | Rockwell .................... 359/172 |
| 6,335,811 B1 | 1/2002 | Sakanaka |
| 6,347,001 B1 | 2/2002 | Arnold et al. .............. 359/159 |
| 6,377,208 B2 | 4/2002 | Chang et al. .......... 342/357.01 |
| 6,490,104 B1 | 12/2002 | Gleckman et al. .......... 359/819 |
| 6,496,237 B1 | 12/2002 | Gleckman .................... 349/62 |
| 6,512,625 B2 | 1/2003 | Mei et al. .................... 359/290 |
| 6,618,177 B1 | 9/2003 | Kato et al. |
| 6,940,593 B2 | 9/2005 | Farr |
| 7,058,307 B2 | 6/2006 | Sakanaka |
| 2001/0012142 A1 | 8/2001 | Carlson ..................... 359/159 |
| 2001/0035995 A1 | 11/2001 | Ruggiero .................... 359/152 |
| 2002/0080452 A1 | 6/2002 | Sakanaka .................... 359/172 |
| 2002/0131121 A1 | 9/2002 | Jeganathan et al. ......... 359/152 |
| 2002/0191297 A1 | 12/2002 | Gleckman et al. .......... 359/629 |
| 2003/0030912 A1 | 2/2003 | Gleckman et al. .......... 359/633 |
| 2004/0081466 A1* | 4/2004 | Walther et al. ............. 398/152 |

OTHER PUBLICATIONS

Walther, Frederick G. et al., U.S. Appl. No. 60/422,185, filed on Oct. 29, 2002, pp. 1-26.

* cited by examiner

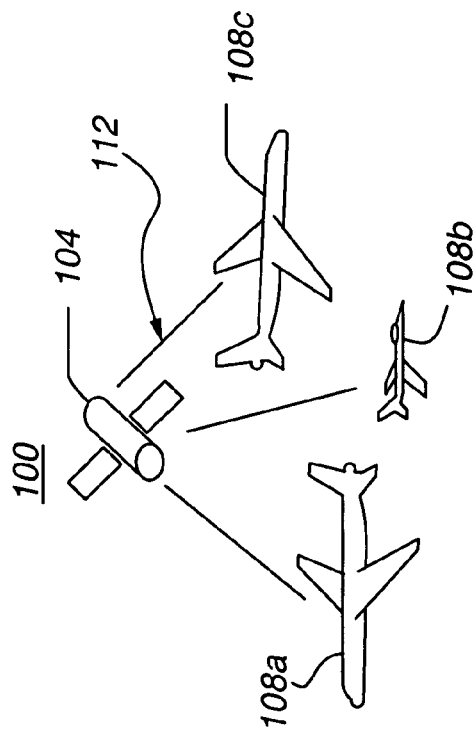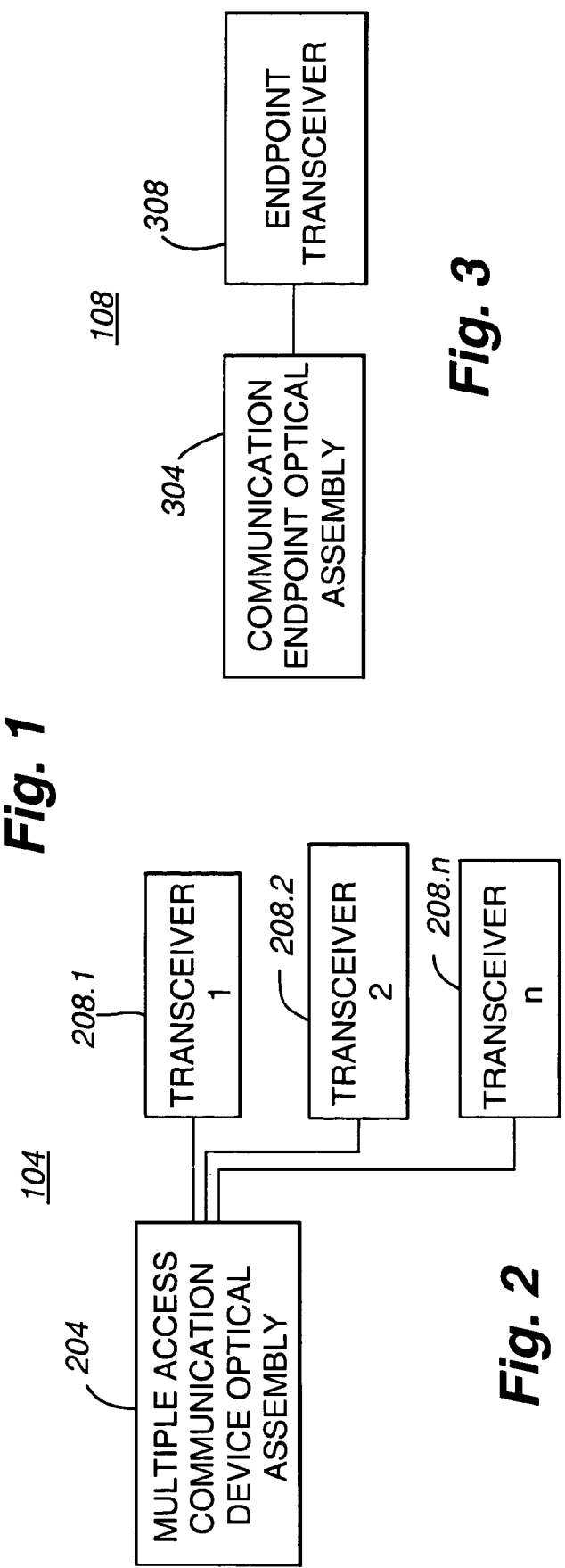

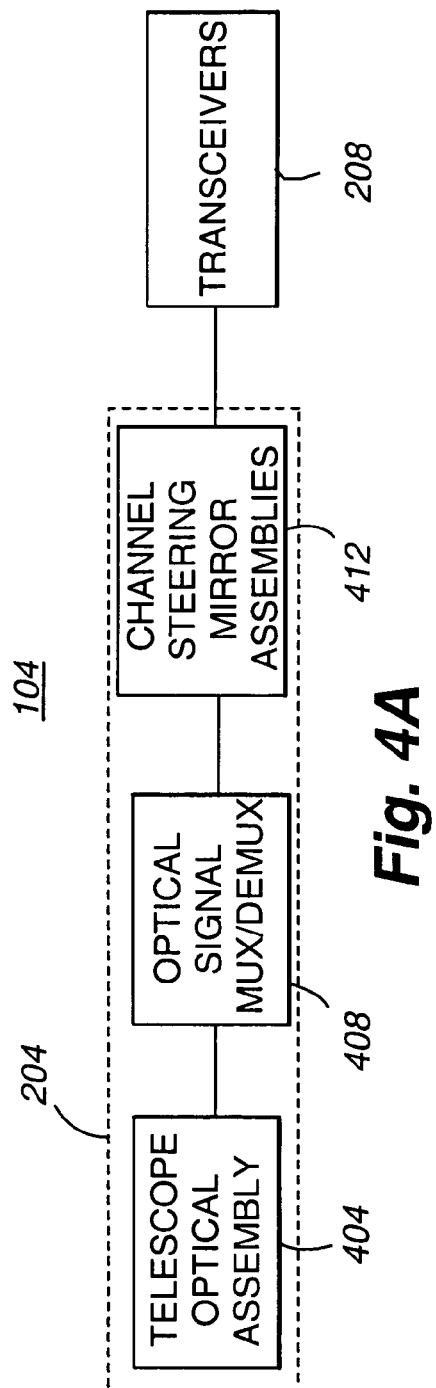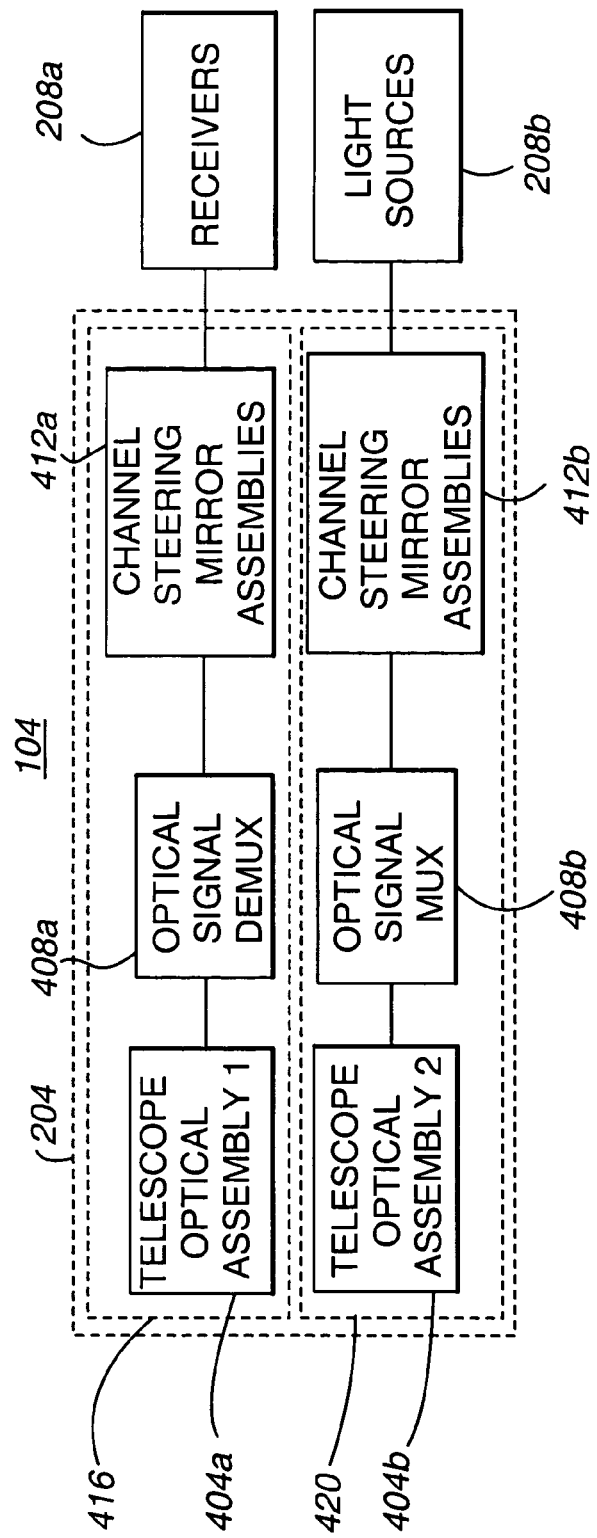
Fig. 4A
Fig. 4B

MULTIPLE ACCESS SPACE COMMUNICATIONS OPTICAL SYSTEM USING A COMMON TELESCOPE APERTURE

FIELD OF THE INVENTION

The present invention is related space laser communications. In particular, the present invention is directed to methods and apparatuses using polarization and wavelength division multiplexing for the simultaneous transmission and/or reception of multiple channels using a single telescope aperture.

BACKGROUND OF THE INVENTION

Communication systems involving the use of satellites are increasingly common. Such systems can be used to transmit data, including real time communications, across large distances. In addition, satellite communication systems used in connection with devices located on or near the surface of the earth can have very large coverage areas.

In a typical satellite communication system, data is transferred between satellites, or between a satellite and communication devices located on or near the surface of the earth, using radio frequencies. Radio frequencies can be projected using broad beams, facilitating the acquisition and tracking of communication devices. However, the bandwidth of radio frequency communication systems is limited.

In order to provide higher bandwidth communications, optical systems, such as systems incorporating laser transmitters, must be used. However, free space optical communication systems have typically been limited to point to point links, where communications are between a single transmitter/receiver and another single transmitter/receiver. One reason that such optical communication systems have been limited to point to point links is that the relatively narrow beams of optical communication systems make the acquisition and tracking of communication endpoints extremely difficult.

In order to permit the acquisition and tracking of communication end points in systems where two communication end points do not have a fixed position with respect to one another, sequential acquisition and communication modes have been proposed. In particular, in the acquisition mode, a relatively broad beam is transmitted. The receiving device, upon detection of the relatively broad beam, may signal the transmitter to effect precise aiming of the signal. Communication may then commence using a communication signal having a relatively narrow beam. However, such systems are not readily adapted to the simultaneous transmission and/or reception of multiple channels at a communication endpoint.

In order to permit the simultaneous reception and/or transmission of multiple channels at a communication endpoint, satellite-based systems have been proposed that employ a telescope having a field of view that encompasses a number of communication endpoints. Communication endpoints within that field of view are located, and may be communicated with using communication signals having narrow beams. In order to position a receiver or transmitter such that it intercepts a signal beam between the multiple access device and a selected communication endpoint, the receiver and/or transmitter is mechanically positioned within the field of view of the telescope. However, such an approach does not solve the problem of potentially lengthy acquisition times, and difficulties in tracking end points that are moving with respect to the multiple access device. In addition, such an approach requires the use of relatively slow and potentially fragile mechanical devices. Furthermore, where the position of communication endpoints relative to the multiple access device are such that two or more communication endpoints occupy substantially the same position within the field of view of the telescope, the ability to distinguish between signals received from such endpoints, or to direct a transmitted signal to a selected one of such devices, is lost.

In connection with communication systems that transmit data between communication endpoints across optical fibers, different channels may be assigned different frequencies. Filters may then be cascaded to demultiplex the channels having different wavelengths. However, such an approach has not been applied to satellite communication systems capable of supporting a large number of channels. One reason for this is that the passband of filters used to separate different channels from one another moves to shorter wavelengths as the angle of incidence of the light moves from normal to the filter. Where the angle of the signal relative to the filter is known in advance, such shifts in wavelength can be compensated for. However, such an approach cannot be taken where the position of a signal, and in particular the signal's angle of incidence with respect to the filter, is not known beforehand, and therefore can lie within a range of angles.

SUMMARY OF THE INVENTION

Embodiments of the present invention are directed to solving these and other problems and disadvantages of the prior art.

In accordance with embodiments of the present invention, a multiple access space laser communication optical system using a single telescope aperture for at least one of reception and transmission is provided. Furthermore, the present invention provides a space laser communication system that is capable of establishing simultaneous and discrete communication links with multiple communication endpoints. The laser beams comprising the channels of the system are coded with a wavelength and a particular polarization state. The present invention provides a multiple access laser communication device that does not require separate acquisition and tracking procedures.

In accordance with an embodiment of the present invention, a single telescope aperture having a field of view capable of covering multiple communication endpoints is provided as part of a multiple access communication device. Also provided as part of the multiple access communication device is an optical signal multiplexer/demultiplexer assembly. In general, operating to provide a reception function, the optical signal multiplexer/demultiplexer receives light comprising multiple laser beams or signals from the telescope optical assembly, and demultiplexes the multiple signals, to deliver a single laser beam or signal to each of a plurality of receivers. Alternatively or in addition, an optical signal multiplexer/demultiplexer may operate to provide a transmission function to multiplex a plurality of communication laser beams or signals and provide those signals to a telescope aperture for transmission to communication endpoints.

In an embodiment in which the optical signal multiplexer/demultiplexer both demultiplexes received signals and multiplexes signals for transmission, a single telescope optical assembly may be provided, such that received and transmitted signals are passed through the same telescope optical assembly.

In an embodiment in which an optical signal multiplexer/demultiplexer only multiplexes or demultiplexes signals, a dual telescope architecture may be used. According to a dual telescope embodiment, a first optical signal multiplexer/demultiplexer receives multiplexed signals from a first telescope optical assembly and demultiplexes the signals, and a second optical signal multiplexer/demultiplexer multiplexes signals and provides the multiplexed signals to a second telescope optical assembly for transmission.

Operating in connection with the reception and demultiplexing of a number of signals, an optical signal multiplexer/demultiplexer in accordance with an embodiment of the present invention divides light received from a telescope optical assembly according to the polarization of the received light. Specifically, received light that is circularly polarized in a first polarization state is transformed into S-polarized light, and received light that is circularly polarized in a second orthogonal polarization state is transformed into P-polarized light. The S-polarized light is separated from the P-polarized light by a polarizing beam splitter. In particular, a first one of the P-polarized light and S-polarized light is allowed to pass through the polarizing beam splitter to a first optical wavelength multiplexer/demultiplexer assembly, while a second one of the S-polarized and P-polarized light is reflected towards a second wavelength multiplexer/demultiplexer assembly. Within each wavelength multiplexer/demultiplexer assembly, light rays are directed such that they are substantially normal to bandpass filters used to separate signals having different wavelengths from one another. Reflection of rays back through quarter wave plates positioned in front of at least some of the bandpass filters may be used to change the polarization of rays rejected by the associated bandpass filter upon the double pass of such a ray through the quarter wave plate. By altering the polarization of incident rays, polarizing beam splitters can be used to direct rays towards additional bandpass filters. In particular, this arrangement allows a theoretically unlimited number of bandpass filters and associated transceivers to be used, while ensuring that the light rays remain substantially normal to each bandpass filter. Accordingly, the present invention allows the separation of channels transmitted across free space as light that is coded with a wavelength and a particular polarization state, even though the position of a communication endpoint associated with a particular signal with respect to a multiple access communication device is not known beforehand.

Operating in connection with the multiplexing and transmission of a number of signals, an optical signal multiplexer/demultiplexer in accordance with an embodiment of the present invention combines discrete signals for provision to a telescope optical assembly. In particular, light of different wavelengths from a first set of discrete sources and comprising different signals is combined using quarter wave plates to selectively polarize the light, bandpass filters, and a polarizing beam splitter, to produce a first set of multiplexed signals having a first common polarization. In addition, light of different wavelengths from a second set of discrete sources and comprising different signals is combined using quarter wave plates to selectively polarize the light, bandpass filters, and a polarizing beam splitter, to produce a second set of multiplexed signals having a second common polarization. The two sets of signals are then combined using a polarizing beam splitter, are circularly polarized using a quarter wave plate, and are provided to the telescope optical assembly for transmission across free space to a number of communication endpoints.

An optical signal multiplexer/demultiplexer that both transmits and receives multiplexed signals through a single telescope aperture may include a first wavelength multiplexer/demultiplexer assembly for demultiplexing received signals and a second wavelength multiplexer/demultiplexer assembly for multiplexing signals for transmission. In general, the received signals have a first circular polarization state and the transmitted signals have a second orthogonal polarization state when traveling between the multiple access communication device and communication endpoints.

The receiver (or transmitter) sections that receive (or provide) single channels may comprise steering mirrors and lenses, to ensure that the light comprising an individual signal is precisely directed towards (or received from) a receiving (or transmitting) optical fiber or transducer device. For instance, the light passed by a bandpass filter may be directed by a coarse steering mirror that is capable of following the signal associated with a communication endpoint moving within the field of view of the telescope aperture, towards a fast steering mirror. The fast steering mirror may operate to remove jitter associated with the multiple access communication device. In accordance with another embodiment of the present invention, a single fast steering mirror for removing jitter associated with the multiple access communication system may be provided at the pupil of the telescope optical assembly. According to such an arrangement, a coarse steering mirror associated with a receiver (or a transmitter) may then direct the signal directly to the receiver (or transmitter).

A method for providing a multiple access space laser communication optical system in accordance with the present invention distinguishes individual signals using a combination of different frequencies and polarizations. In accordance with an embodiment of the present invention, a signal or channel comprising light having a first wavelength and a first circular polarization is separated from a signal or channel comprising light having the next closest wavelength, both by the difference in wavelength, and by the use of a second circular polarization in connection with the second signal. In accordance with still another embodiment of the present invention, reception channels having a first polarity are interleaved between transmission channels having a second polarity. According to the method of the present invention, multiple signals may be reliably distinguished from one another, even when the relative position of the signals' respective communication endpoints are indistinct when viewed from the multiple access communication device.

Additional features and advantages of the present invention will become readily apparent from the following discussion, particularly when taken together with the accompanying drawings.

BRIEF DESCRIPTION OF THE DRAWINGS

FIG. 1 is a schematic depiction of the relationship between a multiple access communication device and multiple communication endpoints in accordance with an embodiment of the present invention;

FIG. 2 is a block diagram depicting components of a multiple access communication device in accordance with an embodiment of the present invention;

FIG. 3 is a block diagram depicting components of a communication endpoint in accordance with an embodiment of the present invention;

FIG. 4A is a block diagram depicting components of a multiple access communication device optical assembly in accordance with an embodiment of the present invention;

FIG. 4B is a block diagram depicting components of a multiple access communication device optical assembly in accordance with another embodiment of the present invention;

DETAILED DESCRIPTION

Figure 5:
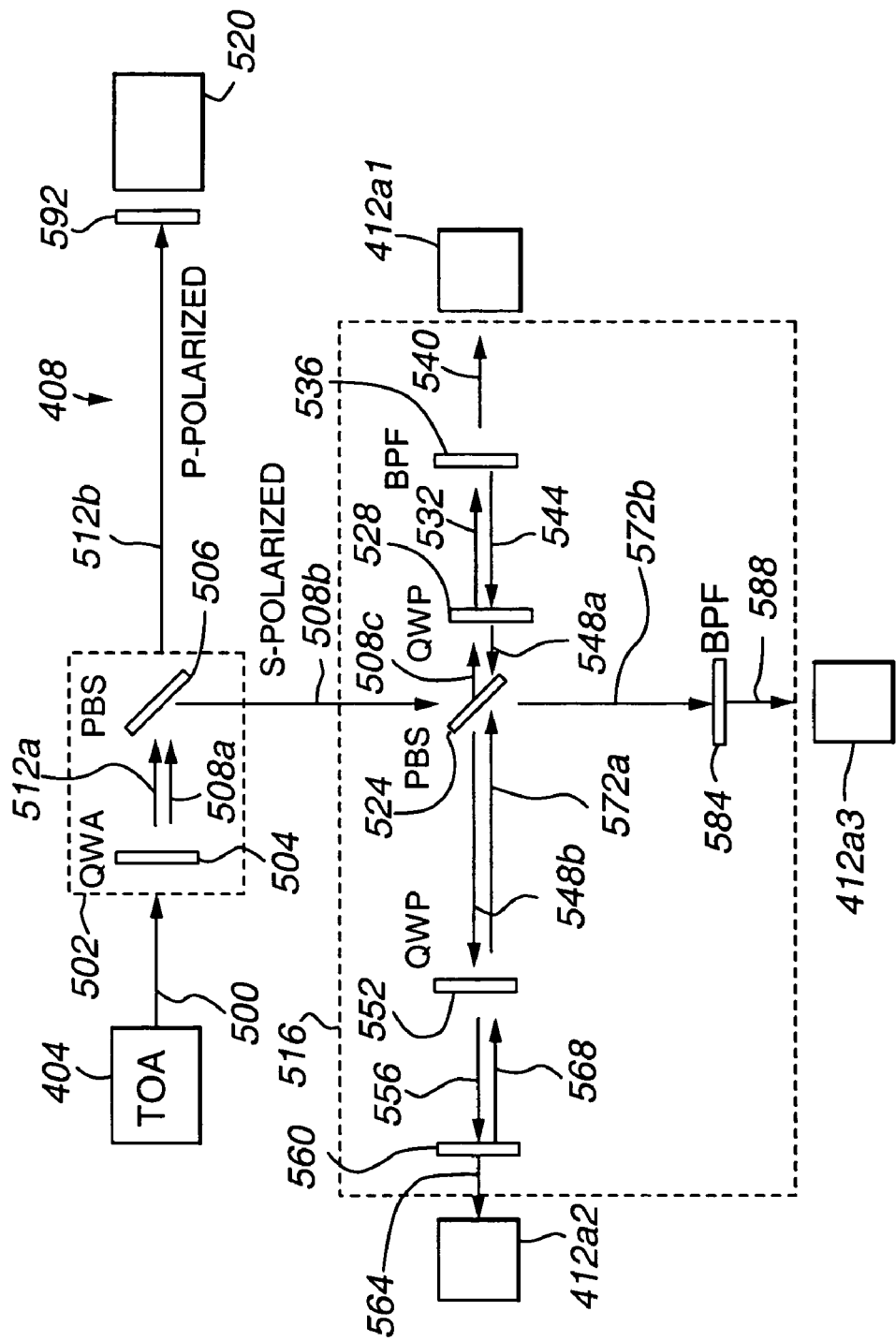
FIG. 5 schematically depicts components of an optical signal multiplexer/demultiplexer in accordance with an embodiment of the present invention.

With reference now to FIG. 1, the relationship between components of a multiple access space laser communications optical system 100 using polarization and wavelength division multiplexing in accordance with an embodiment of the present invention is schematically depicted. In general, the communication system 100 includes a multiple access communication device 104 and one or more communication endpoints 108. As depicted in FIG. 1, the multiple access communication device 104 may comprise a satellite, such as a geosynchronous satellite (GEO). Communication endpoints 108 may include aircraft operating within the field of view of the multiple access communication device 104, or any other mobile or stationary communication endpoint within the field of view 112 of the multiple access communication device 104. In accordance with an embodiment of the present invention, a multiple access communication device 104 comprising a GEO has a field of view of two degrees (2°) providing a coverage area that corresponds to the area of a moderately sized country.

With reference now to FIG. 2, components of a multiple access communication device 104 in accordance with an embodiment of the present invention are depicted in block diagram form. In particular, the multiple access communication device 104 generally includes an optical assembly 204 that functions to collect and demultiplex simultaneously transmitted communication signals as part of a reception function, and to multiplex and transmit multiple communication signals as part of a transmission function. As will be described in greater detail below, the transmission and reception functions may be accomplished using a single optical aperture provided as part of the optical assembly. Alternatively, an optical assembly 204 may comprise a number of optical apertures. For example, a first optical aperture may be provided for the transmission of signals and a second optical aperture may be provided for the reception of signals. The multiple access communication device additionally includes multiple transceivers 208. In accordance with an embodiment of the present invention, a single transceiver 208 comprising an optical receiver is provided for each receive channel of the multiple access communication device 104. In addition, a single transceiver 208 comprising an optical transmitter or source is provided for each transmit channel of the multiple access communication device 104.

With reference now to FIG. 3, components of a communication endpoint 108 that may be used in connection with a multiple access communication device 104 in accordance with an embodiment of the present invention are depicted in block diagram form. In general, each communication endpoint 108 includes a communication endpoint optical assembly 304 capable of receiving and transmitting optical signals. In accordance with an embodiment of the present invention, the communication endpoint optical assembly 304 transmits and receives a single channel, and therefore is not required to multiplex or demultiplex signals. In accordance with other embodiments of the present invention, multiplexing and demultiplexing capabilities may be provided, if desired. The communication endpoint 108 additionally includes an endpoint transceiver 308. The endpoint transceiver 308 may comprise an optical receiver and/or a separate optical transmitter or source.

A multiple access communication device 104 providing combined transmission and reception capabilities as described herein permits the use of a single telescope optical assembly, reducing the size and weight of the multiple access communication device 104, which is particularly advantageous in applications where the multiple access communication device is deployed as a satellite. Alternatively, for example in order to avoid cross-talk between the relatively high power transmitted channels and the relatively low power received channels, a first telescope optical assembly paired with a first optical multiplexer/demultiplexer could be used for the transmission of multiple channels, while a second telescope optical assembly paired with a second optical multiplexer/demultiplexer could be used for the reception of multiple channels.

With reference now to FIG. 4A, components of a multiple access communication device optical assembly 204 in accordance with an embodiment of the present invention having a single optical aperture are depicted in block diagram form. In general, the multiple access communication device optical assembly 204 depicted in FIG. 4A includes a telescope optical assembly 404, an optical signal discriminator or multiplexer/demultiplexer 408, and channel steering mirror assemblies 412. The telescope optical assembly 404 provides a single optical aperture and generally functions to collect or transmit optical signals (i.e. light, such as may be associated with laser beams) within the field of view of the multiple access communication device 104. The optical signal multiplexer/demultiplexer 408 demultiplexes the individual signals or channels received through the telescope optical assembly. In addition, the optical signal multiplexer/demultiplexer 408 multiplexes a number of laser beams comprising a number of individual signals or channels for simultaneous transmission through the telescope optical assembly 404. The channel steering mirror assemblies 412 ensure that the laser beam of each channel is aimed precisely at the corresponding transceivers 208.

With reference now to FIG. 4B, components of a multiple access communication device optical assembly 204 in accordance with an embodiment of the present invention having an optical aperture for use in connection with the transmission of signals and a separate optical aperture for use in connection with the reception of signals are depicted in block diagram form. In general, the multiple access communication device optical assembly 204 illustrated in FIG. 4B includes an optical signal reception and demultiplexing assembly 416, and an optical signal transmission and multiplexing assembly 420. The optical signal reception and demultiplexing assembly 416 includes a first telescope optical assembly 404a for receiving light, an optical signal multiplexer/demultiplexer 408a that performs only a demultiplexing function, and channel steering mirror assemblies 412a. Transceivers comprising receivers 208a receive light from the optical signal reception and demultiplexing assembly 416. The optical signal transmission and multiplexing assembly 420 includes a second telescope optical assembly 406b for transmitting signals as light, an optical signal multiplexer/demultiplexer 408b that performs only a multiplexer function, and channel steering mirror assemblies 412b. The optical signal transmission and multiplexing assembly 420 receives beams of light comprising individual signals or channels from transceivers comprising light sources 208b. In accordance with an embodiment of the present invention, the first telescope optical assembly 404a and the second telescope optical assembly 404b have coincident fields of view, so that the coverage area of the multiple access communication device 104 is the same for both transmission and reception.

In general, the telescope optical assembly 404 functions to receive and/or transmit optical signals anywhere within the field of view of the telescope optical assembly 404. In accordance with an embodiment of the present invention, a telescope optical assembly for use in connection with a GEO has a 2° field of view providing a coverage diameter of about 1300 km at the surface of the Earth. In accordance with a further embodiment of the present invention, the telescope optical assembly 404 is of an all reflecting design and has an entrance pupil diameter of 40 cm.

Figure 15A:
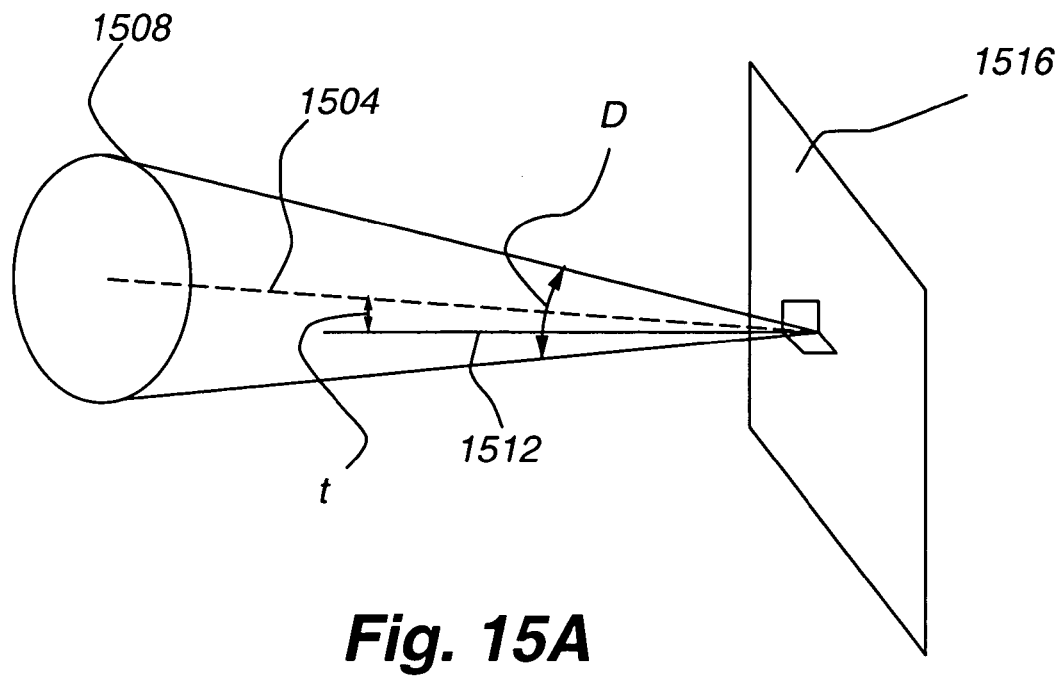
FIG. 15A depicts the relationship between the axis of a cone of incident light and the normal to the plane of a bandpass filter.
Figure 15B:
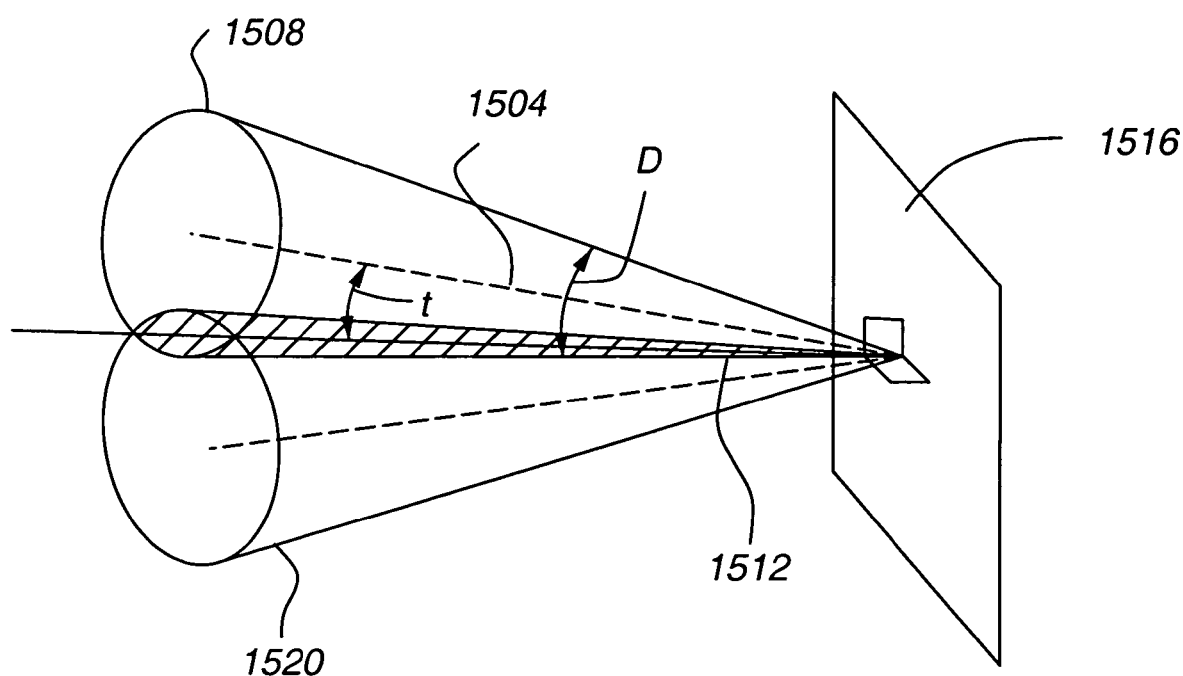
FIG. 15B depicts the relationship between a cone of light incident on a bandpass filter and a cone of light reflected by that bandpass filter in accordance with an embodiment of the present invention.

Components of an optical signal multiplexer/demultiplexer 408 in accordance with an embodiment of the present invention are depicted in FIG. 5. In general, an optical signal multiplexer/demultiplexer 408 in accordance with an embodiment of the present invention includes retarder (e.g. quarter wave) plates, polarizing beam splitters, and bandpass filters. Furthermore, the components of the optical signal multiplexer/demultiplexer 408 are arranged such that light containing one or more signals (i.e. channels) is substantially normal to the bandpass filters, and such that the bandpass filters are positioned at the pupils or intermediate images of the telescope optical assembly 404. As used herein, "substantially normal" is defined to mean that the range of possible angles of incidence of a laser beam is centered about the normal to the plane of the bandpass filter, within a relatively small tolerance. In particular, and with reference now to FIG. 15A, the angle (or tolerance) t between the axis 1504 of the cone 1508 defined by the possible rays of an incoming beam and the normal 1512 to the plane of the bandpass filter 1516 is relatively small. In accordance with an embodiment of the present invention, and with reference now to FIG. 15B, this tolerance t is less than half of the full angle of divergence D of the incident light so that the incident 1508 and reflected 1520 cones of light partially or completely overlap. In accordance with another embodiment of the present invention, the tolerance t is less than about 10% of the full angle of divergence D.

Wave plates are used for transforming one state of polarization to another. In particular, quarter wave plates are used for transforming linearly polarized light to circularly polarized light and vice versa, and for switching S-polarized light to P-polarized light and vice versa. As can be appreciated by one of skill in the art, S-polarized light that passes through a quarter wave plate, and is then reflected so that it passes back through the quarter wave plate will be transformed to P-polarized light. Similarly, P-polarized light will return as S-polarized light after a double-pass through a quarter wave plate. Therefore, the quarter wave plates can function not only to convert light from circularly to linearly polarized light (and vice versa), but can also function to convert S-polarized light to P-polarized light (and vice versa). Embodiments of the present invention may also include half wave plates, and other linear retarder plates for selectively altering the polarization of light beams. Examples of wave plates suitable for use in connection with embodiments of the present invention include compound zero order retarders formed from crystals such as quartz.

In addition, an optical signal multiplexer/demultiplexer 408 in accordance with embodiments of the present invention includes polarizing beam splitters. As can be appreciated by one of skill in the art, polarizing beam splitters can be constructed that reflect P-polarized light and transmit S-polarized light, or that reflect S-polarized light and transmit P-polarized light. Therefore, polarizing beam splitters can be used to separate P-polarized light from S-polarized light. As known by those of skill in the art, exemplary polarizing beam splitters include glass-immersed multilayer optical filters, non-immersed films on plates, and wire grid polarizers.

An optical signal multiplexer/demultiplexer 408 in accordance with embodiments of the present invention also includes optical bandpass or bandstop filters. Optical bandpass filters function to transmit light having a wavelength within the passband of the filter, while reflecting light outside of the passband. Bandstop filters reflect light inside the stopband and transmit light outside. In addition, the filters preferably do not alter the polarization of light that is transmitted or reflected. For example, the retardance on reflection is independent of out-of-band wavelength, and preferably is zero or 180°. Examples of bandpass filters suitable for use in connection with embodiments of the present invention include Fabry-Perot type filters having one or more cavities formed by a stack of dielectrics. As can be appreciated by one of skill in the art, the center of the passband shifts to shorter wavelengths as the angle of incidence grows from normal. Although some amount of wavelength shift can be accommodated by a receiver, such shift should be less than the channel spacing of the system. Accordingly, it is advantageous to center the possible angles of incidence of a ray about the normal of the BPF. Furthermore, because signals may originate from anywhere within the field of view of the telescope optical assembly 404, it is not possible to predict the angle of incidence of a ray associated with a particular channel and thus the passband wavelength shift that will be experienced by the ray. Therefore, in order to maintain reliable separation of channels in a system 100 that supports a large number of channels, it is advantageous to ensure that the range of possible angles of incidence are centered about (i.e. are substantially normal to) the normal of each bandpass filter. As will be appreciated by one of skill in the art from the description provided herein, the present invention provides a structure in which the light rays associated with laser beams comprising data channels are substantially normal to the provided bandpass filters. For example, embodiments of the present invention maintain the possible angle of incidence with respect to provided bandpass filters within a range of +/−8 degrees from normal.

The description of the included components and operation of the optical signal multiplexer/demultiplexer 408 in accordance with the embodiment of the present invention illustrated in FIG. 5 will generally be given in terms of a reception function. Accordingly, the optical signal multiplexer/demultiplexer 408 illustrated in FIG. 5 will be described in terms of demultiplexing a received signal. As can be appreciated by one of skill in the art after consideration of the present disclosure, in a transmission function, the same general selection of components and arrangement of those components can be used, and the described functions and operations are generally performed in reverse, to combine a number of discrete channels into a multiplexed signal. As will also be appreciated from the description provided herein, an optical signal multiplexer/demultiplexer 408 can both multiplex and demultiplex signals.

As shown in FIG. 5, a multiplexed optical signal 500 is received by the optical signal multiplexer/demultiplexer 408 from the telescope optical assembly 404. The multiplexed signal 500 may comprise a plurality of signals, each comprising a single data channel. Each of the signals may be transmitted by a communication endpoint 108 as light circularly polarized in either of two orthogonal directions. Accordingly, the signals received at the telescope optical assembly are circularly polarized, and the multiplexed signal 500 provided by the telescope optical assembly to the optical signal multiplexer/demultiplexer 408 comprises circularly (or elliptically) polarized light.

The multiplexed signal 500 is passed to a primary optical signal polarization discriminator 502 comprising a primary quarter wave plate (QWP) 504 and a primary polarizing beam splitter (PBS) 506. The primary QWP 504 transforms components of the light that are circularly (or elliptically) polarized in a first polarization state into S-polarized light 508. Components of the light received as part of the multiplexed signal 500 that are circularly (or elliptically) polarized in a second orthogonal polarization state are transformed by the primary QWP 504 into P-polarized light 512. Either and/or or both of the S-polarized 508 and P-polarized 512 light may comprise one or more data channels.

The S-polarized 508 and P-polarized 512 light is directed to the primary PBS 506. The primary PBS 506 reflects one of the S-polarized 508 and P-polarized 512 signals towards a first wavelength discriminator or multiplexer/demultiplexer assembly 516, and allows a second of the S-polarized 508 and P-polarized 512 signals to pass to a second wavelength discriminator or multiplexer/demultiplexer assembly 520. In the embodiment illustrated in FIG. 5, P-polarized light 512a from the primary QWP 504 is passed by the primary PBS 506 (shown as ray 512b), and S-polarized light 508a from the primary QWP 504 is reflected by the primary PBS 506 (shown as ray 508b).

The following description will generally discuss the demultiplexing of channels included as part of the S-polarized light 508 by the first wavelength discriminator or multiplexer/demultiplexer assembly 516 of the optical signal multiplexer/demultiplexer 408. However, it should be appreciated that components similar to those described in connection with the demultiplexing of the S-polarized light 508 may be provided in connection with the P-polarized light 512 by the second wavelength multiplexer/demultiplexer assembly 520 of the optical signal multiplexer/demultiplexer 408. In particular, the structure of the second wavelength multiplexer/demultiplexer assembly 520 may be identical to that of the first wavelength multiplexer/demultiplexer assembly 516, if a half wave plate 592 is inserted between the primary PBS 506 and the second wavelength multiplexer/demultiplexer assembly 520. Alternatively, polarizing beam splitters that reflect P-polarized light and transmit S-polarized light could be used in connection with the second wavelength multiplexer/demultiplexer assembly 520. As still another alternative, the second wavelength multiplexer/demultiplexer assembly 520 could use a transmit-reflect-transmit architecture as described elsewhere in the present description, instead of the reflect-transmit-reflect architecture described in connection with FIG. 5. In addition, the second wavelength multiplexer/demultiplexer assembly 520 may provide bandpass filters having passbands that differ from those of the first wavelength multiplexer/demultiplexer assembly 516.

The reflected S-polarized light 508b is directed towards a first PBS 524, which allows P-polarized light to pass and which reflects S-polarized light. The S-polarized light 508b is reflected by the first PBS 524 (shown as ray 508c) towards a first QWP 528. The first QWP 528 transforms the S-polarized light 508 to a circularly polarized signal 532. The circularly polarized signal 532 is directed so that it is substantially normal to a first bandpass filter (BPF) 536. That is, the range of possible angles of incidence of the signal or light 532 is centered about the normal of the first BPF 536. The first BPF 536 allows light at or about a selected frequency (i.e. a selected wavelength) to pass, while reflecting light outside of the passband of the filter 536. The light passed by the first BPF 536 comprises a single data channel, and may be directed to a receiver by a first channel steering mirror assembly 412a1. For purposes of illustration, the first BPF 536 may pass light 540 having a wavelength of about 1544 nm. Furthermore, the first BPF 536 may have a passband that extends from about 1541 nm to about 1547 nm.

The light outside of the passband of the first BPF 536 (depicted by line 544) is reflected back through the first QWP 528. The reflection of the circularly polarized light 544 back through the first QWP 528 results in P-polarized light 548a. The P-polarized light 548 passes through the first PBS 524 (shown as ray 548b) and is incident upon a second QWP 552. Upon passing through the second QWP 552, the P-polarized light 548 is transformed to circularly polarized light 556. The circularly polarized light 556 is incident upon a second BPF 560. In particular, the circularly polarized light 556 is substantially normal to the second BPF 560, and the second BPF 560 allows light 564 having a wavelength within its passband to pass. The light or signal 564 passed by the second BPF 560 comprises a single data channel, and may be directed to a receiver by a second channel steering mirror assembly 412a2. For purposes of illustration, the light 564 may have a wavelength of about 1558 nm.

Light outside of the passband of the second BPF 560 is reflected. The circularly polarized reflected light 568 is passed back through the second QWP 552, resulting in the light becoming S-polarized light 572*a*. The S-polarized light 572*a* is reflected by the second PBS 524 (shown as ray 572*b*) such that it is substantially normal to and incident upon a third BPF 584. Light 588 having a wavelength within the passband of the third BPF 584 comprises a single data channel and is passed such that it is incident upon a third channel steering mirror assembly 412*a*3. Any light outside of the passband of the third BPF 584 is reflected. For illustration purposes, the light 588 passed by the third BPF 584 may have a wavelength of 1530 nm.

As can be appreciated from the above description, taken together with FIG. 5, the present invention provides an optical signal multiplexer/demultiplexer 408 that is capable of receiving multiple channels from a telescope optical assembly 404 simultaneously and demultiplexing those signals. In particular, the embodiment illustrated in FIG. 5 includes a first wavelength multiplexer/demultiplexer assembly 516 that is capable of demultiplexing three channels received as light circularly polarized in a first state. Furthermore, the geometry and arrangement of the optical signal multiplexer/demultiplexer 408 ensures that the signals containing one or more channels within a communication system 100 are substantially normal to the included bandpass filters, to ensure that any frequency shift in the center of the passband due to the variation of angle of incidence is maintained within acceptable limits. Furthermore, the optical signal multiplexer/demultiplexer 408 can reliably operate with respect to signals originating anywhere within the field of view of the telescope optical assembly 404.

In the description set forth above in connection with FIG. 5, the separation of S-polarized light 508 (received as light circularly polarized in a first direction) into three discrete channels is described. As noted above and as can be appreciated by one of skill in the art, the P-polarized light 512 (received as light circularly polarized in a second direction that is orthogonal to the first direction) may be similarly demultiplexed by the second wavelength multiplexer/demultiplexer assembly 520 by passing the P-polarized laser beam or beams passed by the primary PBS 506 through a half wave plate 592 to S-polarize the beam or beams. The second wavelength multiplexer/demultiplexer assembly 520 may then have a structure that is similar to that of the first wavelength multiplexer/demultiplexer assembly 516. Alternatively, the half wave plate 592 can be omitted, and the second wavelength multiplexer/demultiplexer assembly 520 can use polarizing beam splitters that transmit S-polarized light and reflect P-polarized light. As still another alternative, the second wavelength multiplexer/demultiplexer assembly 520 can use a transmit-reflect-transmit architecture. As can be appreciated, the second wavelength multiplexer/demultiplexer assembly 520 may include bandpass filters having different passbands than those of the first wavelength multiplexer/demultiplexer assembly 516. The optical signal multiplexer/demultiplexer 408 of FIG. 5 can be considered an embodiment of the present invention that is capable of supporting six discrete channels.

In addition, it should be appreciated that either or both of the P-polarized 512 or S-polarized 508 light can include a greater or lesser number of channels. For example, where the optical signal multiplexer/demultiplexer 408 is to be capable of separating the S-polarized light 508 into more than three channels, the first wavelength multiplexer/demultiplexer assembly 516 may be scaled by providing an additional polarizing beam splitter in place of the third bandpass filter 584. Quarter wave plates and associated bandpass filters may then be provided to further separate different channels based on the wavelength of their signals. Such an arrangement is illustrated in FIG. 6.

Figure 6:
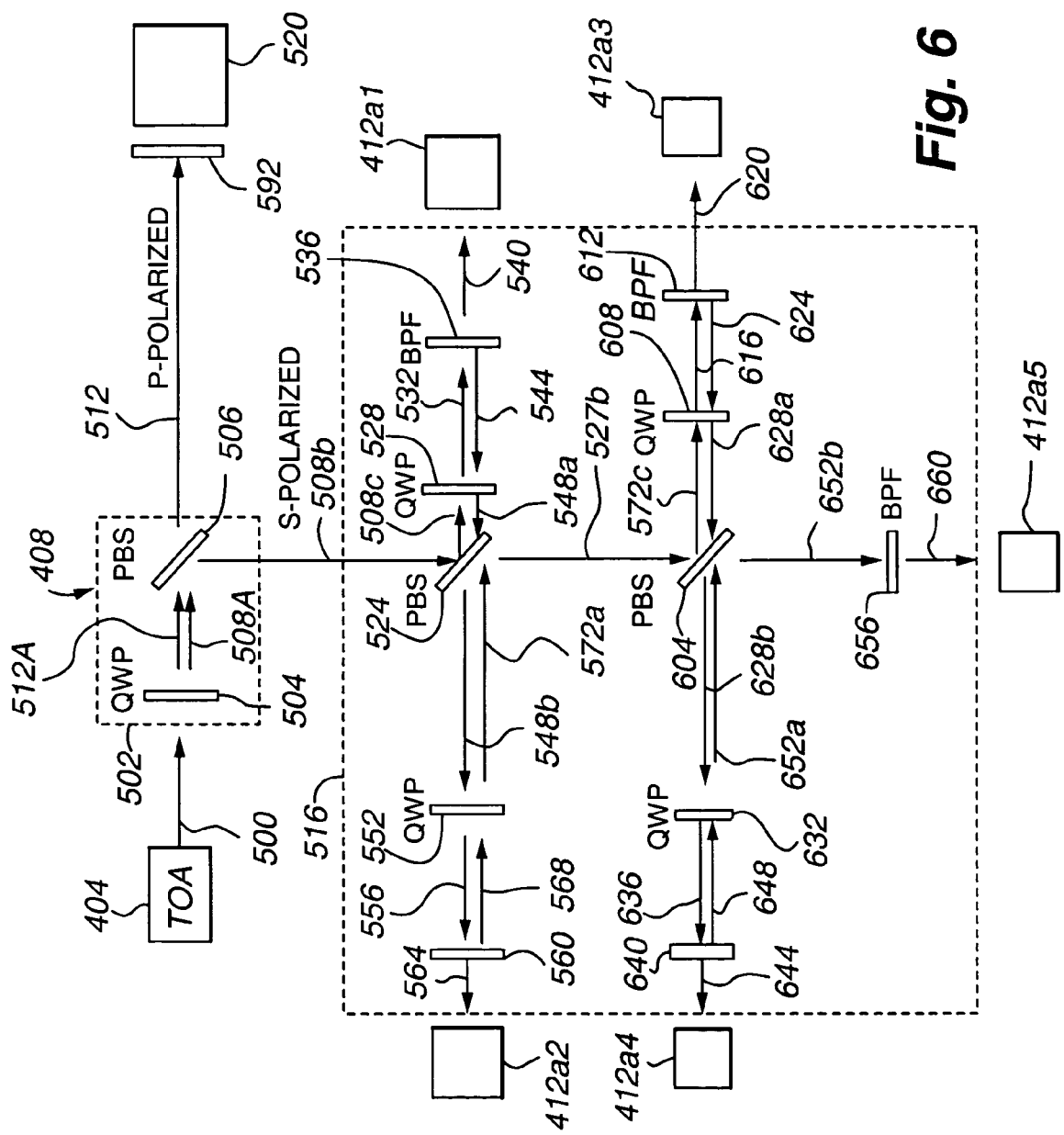
FIG. 6 schematically depicts components of an optical signal multiplexer/demultiplexer in accordance with another embodiment of the present invention.

FIG. 6 shows the addition of a second PBS 604 as part of the first wavelength multiplexer/demultiplexer assembly 516, in place of the third BPF 584 of the embodiment of FIG. 5. The second PBS 604 reflects S-polarized light and passes P-polarized light. Light 572*c* reflected by the second PBS 604 is directed towards a third QWP 608, which circularly polarizes the S-polarized light (ray 616), and towards a third BPF 612 such that it is substantially normal to the third BPF 612. Any component of the circularly polarized light 616 having a wavelength within the passband of the third BPF 612 is passed such that it is incident upon a third channel steering mirror assembly 412*a*3 as ray 620.

Light 624 reflected by the third BPF 612 is passed back through the third QWP 608. The reflection of the light 624 back through the third QWP 608 transforms the reflected light 624 into P-polarized light 628*a*. The P-polarized light 628*a* then passes through the second PBS 604 (ray 628*b*). A fourth QWP 632 circularly polarizes the light (ray 636), which is then incident upon and substantially normal to a fourth BPF 640. Light 644 included in the ray 636 having a wavelength within the passband of the fourth BPF 640 is passed, so that it is incident upon a fourth channel steering mirror assembly 412*a*4.

The light 648 outside of the passband of the fourth BPF 640 is reflected back through the fourth quarter wave plate 632. The reflection of the light 648 back through the fourth QWP 632 transforms the light 648 into S-polarized light 652*a*. The S-polarized light 652*a* is reflected (ray 652*b*) by the second PBS 604 to a fifth BPF 656, such that the ray 652*b* is substantially normal to the fifth BPF 656. The light 660 passed by the fifth BPF 656 comprises a single data channel and is received by a fifth channel steering mirror assembly 412*a*5. Any light included in ray 652*b* having a wavelength outside of the passband of the fifth BPF 656 is rejected.

As can also be appreciated by one of skill in the art, by passing the P-polarized light 512*b* from the primary PBS 506 through a half wave plate 592, and by providing a similar structure as part of the second wavelength multiplexer/demultiplexer assembly 520 in which bandpass filters have passbands adapted to the channels to be received and/or transmitted by the second wavelength multiplexer/demultiplexer assembly 520, FIG. 6 can be understood to illustrate an embodiment of the present invention capable of supporting ten discrete channels. Alternatively, the half wave plate 592 can be omitted, and the second wavelength multiplexer/demultiplexer assembly 520 can include polarizing beam splitters that reflect P-polarized light and transmit S-polarized light can be used with bandpass filters having appropriate passbands, or a transmit-reflect-transmit architecture can be used with appropriate bandpass filters.

As can be appreciated by one of skill in the art, the modular architecture of a multiplexer/demultiplexer 408 in accordance with an embodiment of the present invention supports scaling to an even greater number of channels. In particular, scaling of the wavelength multiplexer/demultiplexer assemblies 516, 520 can be accomplished by adding additional stages, as described in connection with the modifications to the optical signal multiplexer/demultiplexer 408 described in connection with FIG. 5 to obtain the optical signal multiplexer/demultiplexer 408 described in connection with FIG. 6. Furthermore, it can be appreciated that, even with the addition of successive stages, an optical signal multiplexer/demultiplexer 408 in accordance with embodiments of the present invention is configured such that rays incident upon each bandpass filter are substantially normal to the filter.

As noted above, although the discussion of aspects of embodiments of the present invention illustrated in FIGS. 5 and 6 has largely been in terms of a multiple access communication device 104 having a first optical signal multiplexer/demultiplexer 408 that demultiplexes signals from communication endpoints 108, for example in connection with an optical signal reception and demultiplexing assembly 416, and a second optical signal multiplexer/demultiplexer 408 that multiplexes signals for transmission to communication endpoints 108 that would be used in connection with an optical signal transmission and multiplexing assembly 420, thus providing a dual telescope multiple access communications device 104 as illustrated in FIG. 4B, the present invention is not so limited. In particular, a multiple access communication device 104 in accordance with an embodiment of the present invention is also capable of producing and transmitting a multiplexed signal containing a number of individual channels to different communication endpoints 108, in addition to demultiplexing signals, by providing an optical signal multiplexer/demultiplexer 408 that both multiplexes and demultiplexes discrete signals. An optical signal multiplexer/demultiplexer 408 in accordance with an embodiment of the present invention capable of both providing multiple channels for transmission and receiving multiple channels (for example, the optical signal multiplexer/demultiplexer 408 illustrated in FIG. 4A) allows a single telescope aperture to be used for both the transmission and the reception of laser beams comprising such channels. Accordingly, such an embodiment provides a single telescope multiple access communication device 104 that can be smaller and lighter than a dual telescope multiple access communication device 104.

Figure 7:
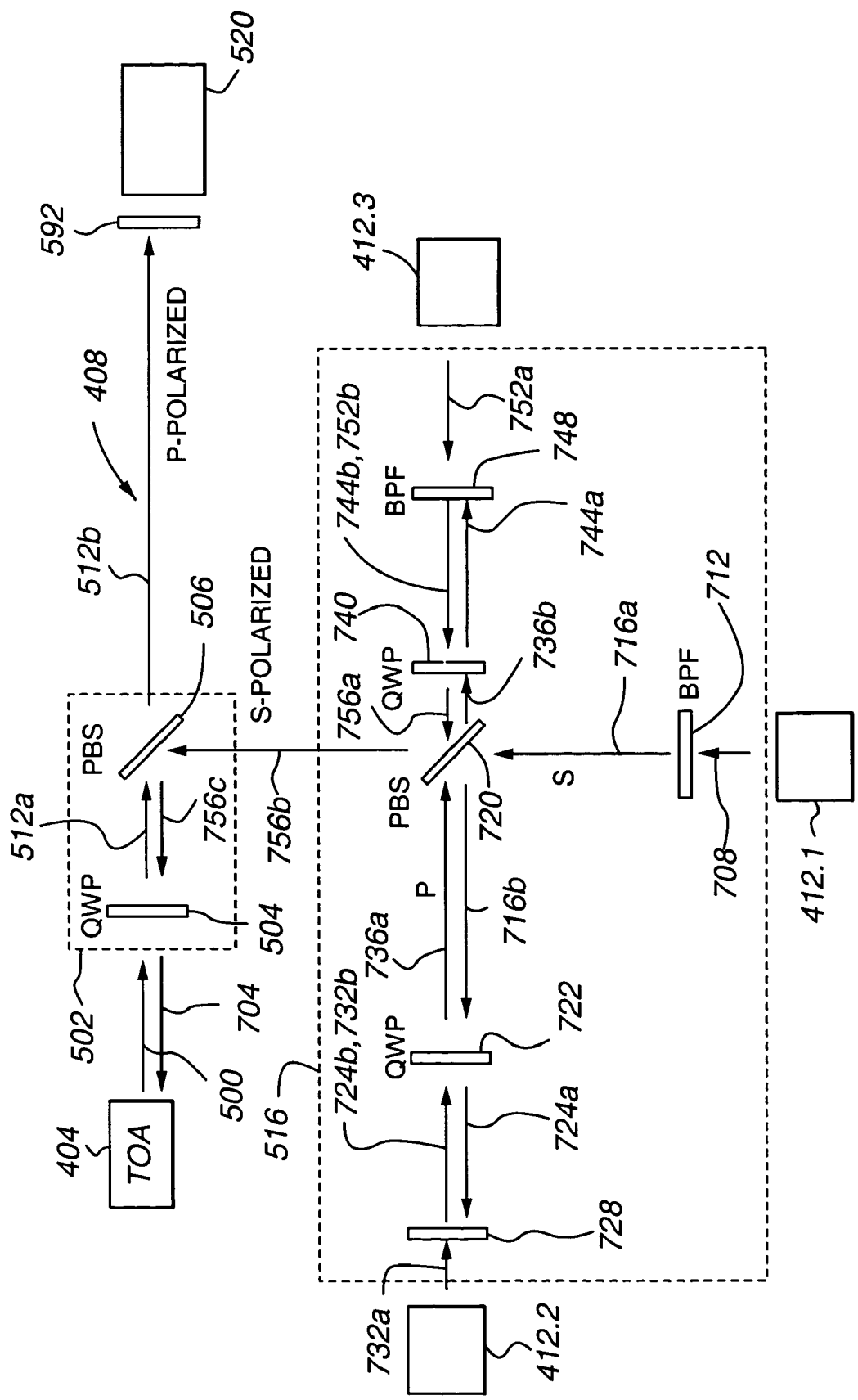
FIG. 7 schematically depicts components of an optical signal multiplexer/demultiplexer in accordance with another embodiment of the present invention.

Components of an optical signal multiplexer/demultiplexer 408 provided in connection with a multiple access communication device 104 using a single telescope optical assembly 404 for transmitting and receiving signals in accordance with an embodiment of the present invention are illustrated in FIG. 7. According to the embodiment of FIG. 7, a multiplexed optical signal 500 is received by the optical signal multiplexer/demultiplexer 408 from the telescope optical assembly 404. In addition, the optical signal multiplexer/demultiplexer 408 provides a multiplexed optical signal 704 to the telescope optical assembly 404 for transmission to communication endpoints 108. The multiplexed optical signal 704 provided to the telescope optical assembly 404 for transmission has a polarization state that is orthogonal to the polarization state of the received multiplexed signal 500 received from the telescope optical assembly 404. The received multiplexed signal 500 is passed by the primary optical signal polarization discriminator 502 to the half wave plate 592, and provided to the second wavelength multiplexer/demultiplexer assembly 520 for demultiplexing, for example as described in connection with FIG. 5. As can be appreciated, and as described more fully elsewhere in the present disclosure, the half wave plate 592 may be omitted.

The multiplexed signal 704 for transmission originates as a number of individual laser beams, which are each provided to the first wavelength multiplexer/demultiplexer assembly 516 by a corresponding channel steering mirror assembly 412 associated with a transceiver 208 comprising a light source (not shown). In particular, a first channel steering mirror assembly 412.1 provides a laser beam comprising a single communication channel for transmission, represented in FIG. 7 by ray 708, to a first bandpass filter 712. The laser beam comprising ray 708 is S-polarized. Accordingly, the first channel steering mirror assembly 412.1 and/or the associated transceiver 208 is an example of a source that includes the optical components, such as retarder plates, necessary to provide light of the required polarization (in this case S-polarized) to the first wavelength multiplexer/demultiplexer assembly 516. In addition, the light is provided at or about a selected wavelength.

The light comprising ray 708 is substantially normal to the first bandpass filter 712, which has a passband configured to allow the provided light to be transmitted by the first BPF 712. The signal continues (shown as ray 716a) towards a first polarizing beam splitter 720 that is configured to reflect S-polarized light and transmit P-polarized light. The ray 716a is thus reflected by the first PBS 720 (shown as ray 716b). The light 716b is then passed through a first quarter wave plate 722, which transforms the S-polarized light represented by ray 716b to circularly polarized light represented by ray 724a. The light comprising ray 724a is incident upon and substantially normal to a second bandpass filter 728. The second BPF 728 has a passband that does not include the wavelength of the light comprising ray 724a. Accordingly, the light comprising ray 724a (and thus the signal from the first channel steering mirror assembly 412.1) is reflected (represented by ray 724b).

At the second bandpass filter 728, the signal from the first channel steering mirror assembly 412.1 is joined by a signal provided by a second channel steering mirror assembly 412.2. In particular, the second channel steering mirror assembly 412.2 is associated with a light source 208 that provides a signal comprising light having a wavelength within the passband of the second BPF 728. In addition, the channel steering mirror assembly 412.2 provides light that is circularly polarized and that has a polarization state like that of the light represented by ray 724. The light comprising the signal from the second channel steering mirror assembly 412.2, represented by ray 732a, is passed by the second BPF 728 (see ray 732b). Both the light from the first channel steering mirror assembly 412.1 reflected by the second BPF 728 (ray 724b) and the light from the second channel steering mirror assembly 412.2 passed by the second BPF 728 (ray 732b) are passed through the first QWP 722. The first QWP 722 transforms the circularly polarized rays 724b and 732b into P-polarized light (represented by ray 736a). The P-polarized light 736a passes through the first PBS 720. The light that passes through the first PBS 720 (represented by ray 736b) is incident upon a second quarter wave plate 740. The second QWP 740 transforms the incident P-polarized light into circularly polarized light (represented by ray 744a), which then is incident upon and substantially normal to a second bandpass filter 748. The second BPF 748 has a passband that does not include the wavelengths of the signals provided from either of the first 412.1 or second 412.2 channel steering mirror assemblies. Accordingly, those signals are reflected (represented by ray 744b).

A third signal is provided by a light source 208 (not shown) associated with a third channel steering mirror assembly 412.3 (represented by ray 752a). The light provided by the third channel steering mirror assembly 412.3 is circularly polarized, and has a wavelength that is within the passband of the third BPF 748. In addition, the signal provided by the third channel steering mirror assembly 412.3 is substantially normal to the third BPF 748. Accordingly, the light reflected by the third BPF 748 (represented by ray 744b) is joined by the light provided by the third channel steering mirror assembly 412.3 (represented by ray 752b). The circularly polarized light represented by rays 744b and 752b is passed back through the second QWP 740, which transforms the light into S-polarized light (represented by ray 756a). The S-polarized light is reflected by the first PBS 740 (represented by ray 756b) to the primary optical signal polarization discriminator 502.

The primary optical signal polarization discriminator 502 includes a primary PBS 506 that reflects S-polarized light and transmits P-polarized light. Accordingly, the light comprising signals from each of the first 412.1, second 412.2, and third 412.3 channel steering mirror assemblies is reflected by the primary PBS 506 (shown as ray 756c). The light represented by ray 756c is passed through the primary QWP 504 of the primary optical signal polarization discriminator 502, which transforms the light into circularly polarized light for transmission by the telescope optical assembly 404 (represented by ray 704).

From the description provided herein, it can be appreciated that an embodiment of the present invention having an optical signal multiplexer/demultiplexer 408 configured to both transmit and receive multiplexed signals can be provided. The embodiment illustrated in connection with FIG. 7, in which S-polarized signals are provided to the primary PBS 506 for transmission is believed to provide a configuration in which the amount of light that is leaked from the wavelength multiplexer/demultiplexer assembly dedicated to the transmission of signals (e.g., first wavelength multiplexer/demultiplexer assembly 516) to the wavelength multiplexer/demultiplexer assembly dedicated to the reception of multiplexed signals (e.g., second wavelength multiplexer/demultiplexer assembly 520) is reduced. However, as can be appreciated by one of skill in the art, alternate configurations could be implemented. In addition, it should be appreciated that the first wavelength multiplexer/demultiplexer assembly 516 can be scaled to support additional light sources (and thus additional transmission channels) by providing additional stages of polarizing beam splitters, quarter wave plates, and bandpass filters.

Figure 8:
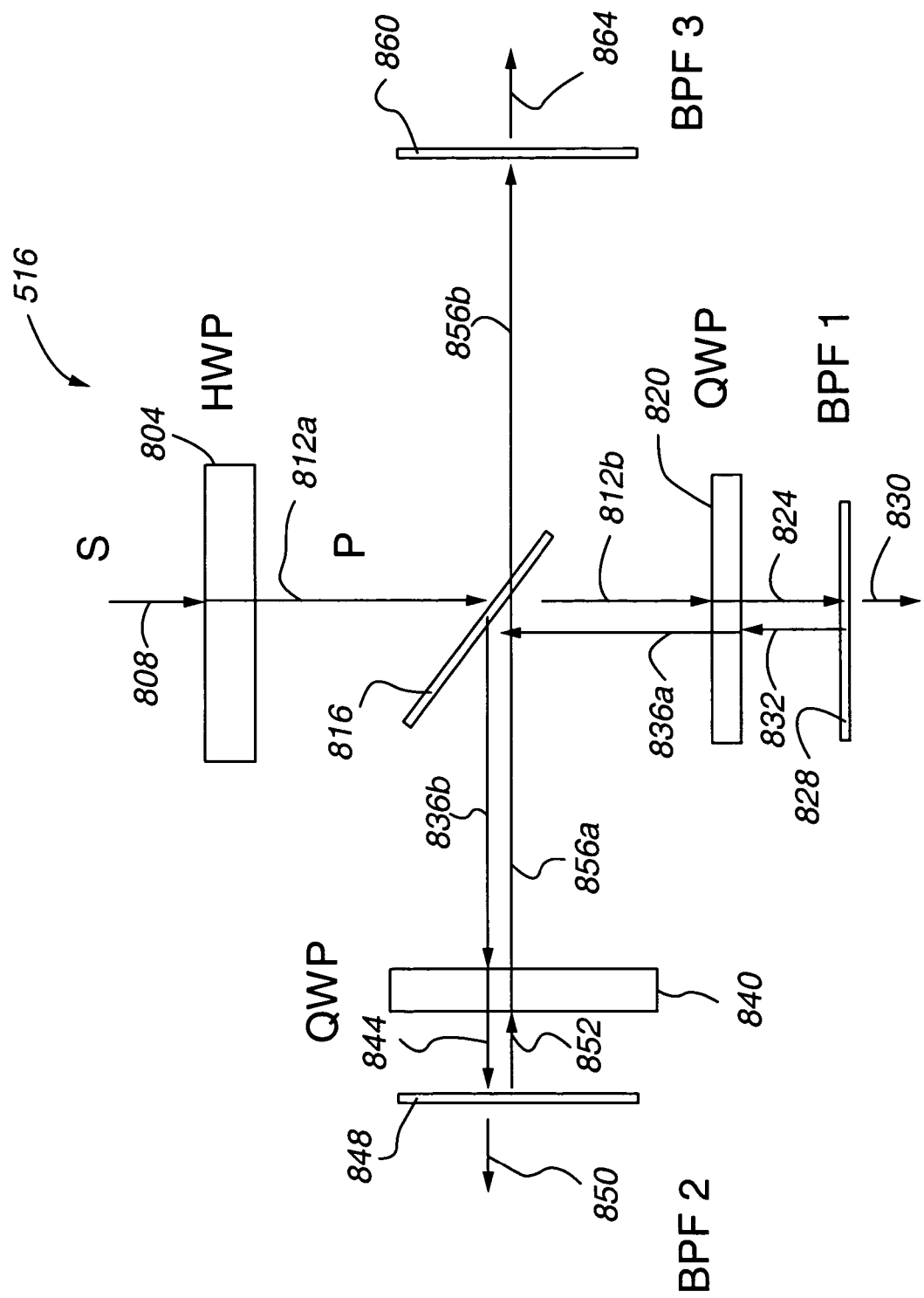
FIG. 8 schematically depicts components of a wavelength multiplexer/demultiplexer assembly having a transmit-reflect-transmit architecture in accordance with an embodiment of the present invention.

The example wavelength multiplexer/demultiplexer assemblies described in connection with FIGS. 5, 6 and 7 generally set forth what can be referred to as a reflect-transmit-reflect architecture, in which light received at the wavelength multiplexer/demultiplexer assembly 516 or 520 is first reflected, then transmitted, and then reflected by the first PBS 524, 740. With reference now to FIG. 8, an alternate configuration, in which light is transmitted, reflected, and then transmitted, by a first PBS is illustrated. This alternate configuration may be termed a transmit-reflect-transmit architecture. As shown in FIG. 8, a first wavelength multiplexer/demultiplexer assembly 516 having a transmit-reflect-transmit architecture includes a half wave plate 804 to transform the S-polarized light received from the primary optical signal polarization discriminator 502 (represented by ray 808) into P-polarized light (represented by ray 812a). The P-polarized light is transmitted by the first PBS 816. The light passing through the first PBS 816 (shown as ray 812b) is passed through a first QWP 820 which circularly polarizes the light (represented by ray 824). The now circularly polarized light is incident upon and substantially normal to a first BPF 828. Any component of the light represented by ray 824 having a wavelength within the passband of the first BPF 828 is passed (shown as ray 830) to a corresponding channel steering mirror assembly 412 (not shown in FIG. 8).

The portion of the light comprising wavelengths not within the passband of the first BPF 828 is reflected (represented by ray 832) back through the first QWP 820, resulting in a beam of S-polarized light (represented by ray 836a). The beam of S-polarized light is reflected by the first PBS 816 (represented by ray 836b). The S-polarized light is then passed through a second QWP 840, which transforms the S-polarized light into circularly polarized light (represented by ray 844). The beam associated with ray 844 is incident upon and substantially normal to a second BPF 848. The second BPF 848 allows components of the incident light having a wavelength within the passband of the second BPF 848 to pass (shown as ray 850) to a second channel steering mirror assembly 412 (not shown in FIG. 8).

Those portions of the light incident upon the second BPF 848 having a wavelength outside of the passband of the second BPF 848 are reflected (represented as ray 852) back through the second QWP 840. The transmission of the light back through the second QWP 840 results in P-polarized light (represented by ray 856a). The P-polarized light then passes through the first PBS 816 (ray 856b) and is incident upon and substantially normal to a third BPF 860. Components of the light within the passband of the third BPF 860 are allowed to pass (shown as ray 864) to a third channel steering mirror assembly 412 (not shown in FIG. 8).

As can be appreciated by one of skill in the art, where a transmit-reflect-transmit architecture is used in connection with a wavelength multiplexer/demultiplexer assembly adapted to receive P-polarized light (e.g., second wavelength multiplexer/demultiplexer assembly 520), a half wave plate (e.g., half wave plate 592 or 804) can be omitted, and a transmit-reflect-transmit architecture as illustrated in FIG. 8 can be used to demultiplex separate channels. As can also be appreciated, a transmit-reflect-transmit architecture can also be used in connection with the multiplexing of signals for transmission by a telescope optical assembly 404 by using the structure generally described in connection with FIG. 8 and using channel steering mirror assemblies 412 that are each associated with a transceiver 208 comprising a light source. According to still another embodiment, a transmit-reflect-transmit wavelength multiplexer/demultiplexer assembly could be constructed using a PBS that transmitted S-polarized light and that reflected P-polarized light. Furthermore, it can be appreciated that the number of channels associated with a transmit-reflect-transmit device can be scaled by including additional polarizing beam splitters, quarter wave plates, and bandpass filters.

Figure 9:
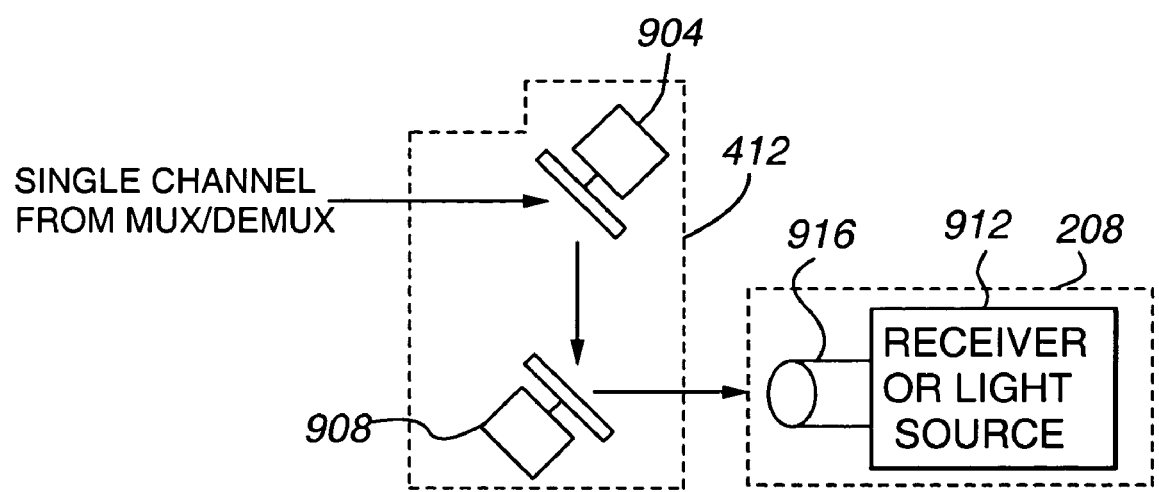
FIG. 9 schematically depicts components of a channel steering mirror assembly in accordance with an embodiment of the present invention.

With reference now to FIG. 9, a channel steering mirror assembly 412 and a transceiver 208 in accordance with an embodiment of the present invention are schematically depicted. In general, the channel steering mirror assembly 412 may include a coarse steering mirror 904. The coarse steering mirror 904 functions to direct a beam containing a single channel of the communication system 100 (see, e.g., ray 540 of FIG. 5) towards the boresight of a fixed receiver. The inclusion of a coarse steering mirror 904 with each channel steering mirror assembly 412 is considered desirable, because the proper functioning of optical transceivers 208 requires that a received ray be centered upon the boresight of the receiving fiber or detector 916 with great precision. In particular, because each channel supported by a multiple access communication device 104 may be established with a different communication endpoint 108, and because each communication endpoint 108 may appear anywhere within the field of view of the multiple access communication device 104, the ability to separately steer individual signals is desirable. Accordingly, the coarse steering mirror 904 may be used to direct the beam provided by the optical signal multiplexer/demultiplexer, ensuring that the beam can be positioned on the boresight of the receiving fiber 916 of the optical transceiver's 208 receiver 912. Aiming of the coarse steering mirror 904 may be accomplished using a focal plane array for initial position information as is known in the art.

The fast fine steering mirror 908 is configured to allow for the correction of jitter associated with the multiple access communication device 104. Accordingly, relatively high frequency vibrations having a small amplitude can be removed by the fast fine steering mirror 908. The ray from the fast fine steering mirror 908 is then directed to the receiving fiber 916. Aiming of the FSM may be effected using an error signal generated by a nutating mirror or fiber as is known in the art. As can be appreciated by one of skill in the art, a receiver may comprise a low noise EDFA preamplifier with PIN or avalanche photodiode or an avalanche photodiode alone.

In a transmitting mode or configuration, the optical 208 transceiver may comprise a laser transmitter or light source 912 that may include a fiber or amplifier 916. A transceiver 912 comprising a transmitter is configured to provide a signal having a polarization and wavelength appropriate to the associated channel and the point within the first wavelength multiplexer/demultiplexer assembly 516 or second wavelength multiplexer/demultiplexer assembly 520 at which the signal is injected. As can be appreciated by one of skill in the art, a transmitter may comprise a tuned laser amplified by erbium-doped fiber amplifiers coupled in with the appropriate polarization.

In accordance with another embodiment of the present invention, instead of a fast fine steering mirror 908 being included as part of each channel steering mirror assembly 412, a single fast fine steering mirror 908 is provided. In particular, a single fast fine steering mirror 908 can be positioned to receive the multiplexed signal 500 (see, e.g., FIG. 5) directly from the telescope optical assembly 404, or after the light has passed through the primary quarter wave plate 504 of the optical signal multiplexer/demultiplexer 408, to remove jitter from the multiplexed signal 500. According to such an embodiment, each channel steering mirror assembly 412 could then omit the fast fine steering mirror 908, and include only a coarse steering mirror 904 for each channel to direct the ray containing the demultiplexed signal to the receiving (or transmitting) fiber 916 of the transceiver 912. The use of a single fast fine steering mirror 908 is possible because the function of such a mirror is to remove jitter introduced by the multiple access communication device 104 itself. Such a use places strict requirements on the a focal magnification uniformity (distortion) for the telescope.

Figure 10:
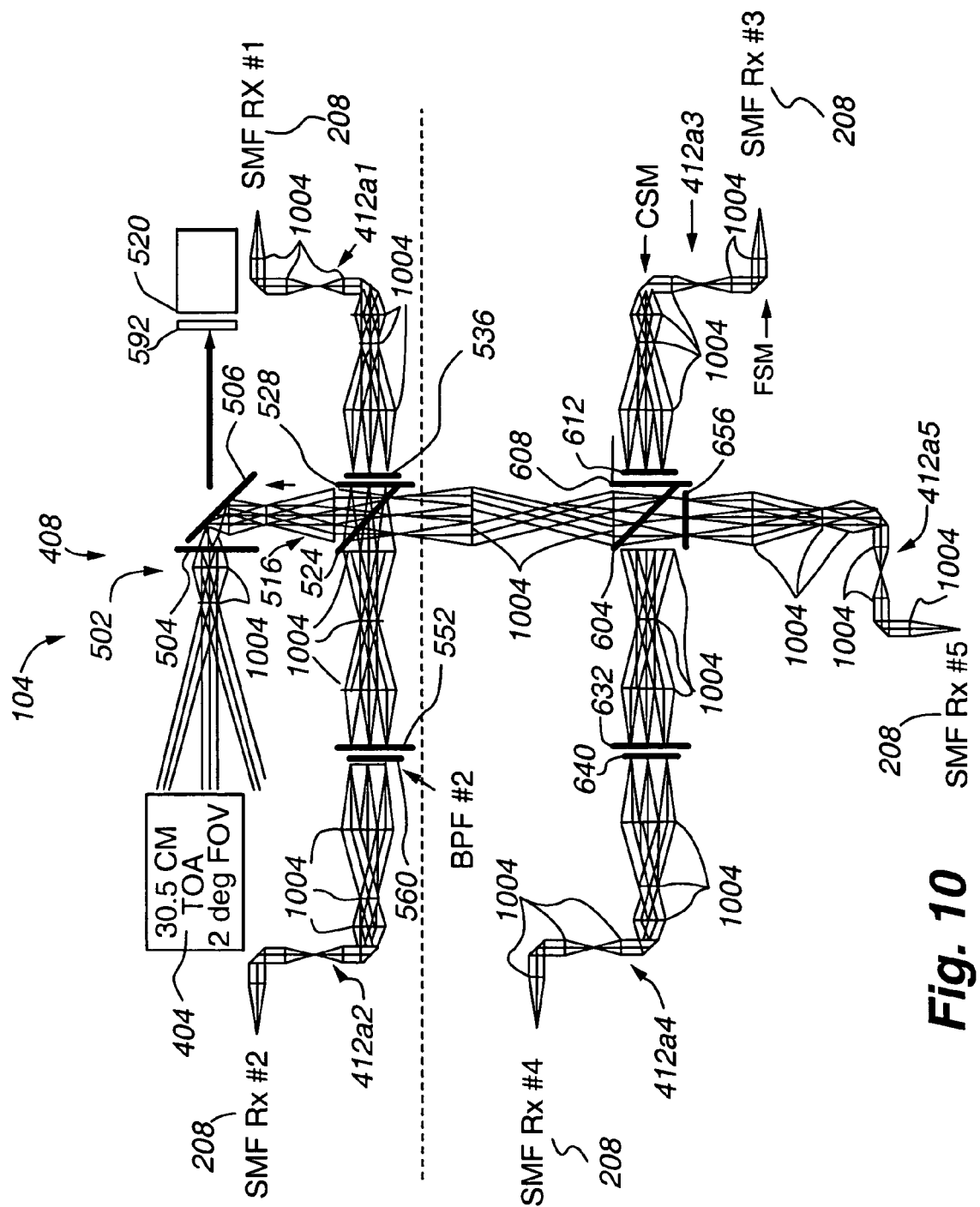
FIG. 10 schematically depicts components of a multiple access communication device in accordance with an embodiment of the present invention.

With reference now to FIG. 10, a multiple access laser communication device 104 in accordance with an embodiment of the present invention is depicted. In particular, FIG. 10 illustrates the transmission paths of example rays through portions of an optical signal multiplexer/demultiplexer 408 like the one depicted in FIG. 6, and through associated channel steering mirror assemblies 412. More particularly, FIG. 10 includes representations of lenses 1004, depicted in FIG. 10 as lines transverse to and at points of refraction in the paths of the rays. As can be appreciated by one of skill in the art, imaging lenses or mirrors of power are required to ideally keep the various components, such as steering mirrors 904, 908 and bandpass filters at the pupil of the system in order to keep the sizes of these components manageable, and to control the possible angles of incidence of rays with respect to those components. In addition, FIG. 10 illustrates the imaging of rays onto the receiving fibers of transceivers 208. As can be appreciated by one of skill in the art, the multiple access communication device 104 depicted in FIG. 10 could be modified to substitute light sources in place of the receiving fibers shown.

Figure 11:
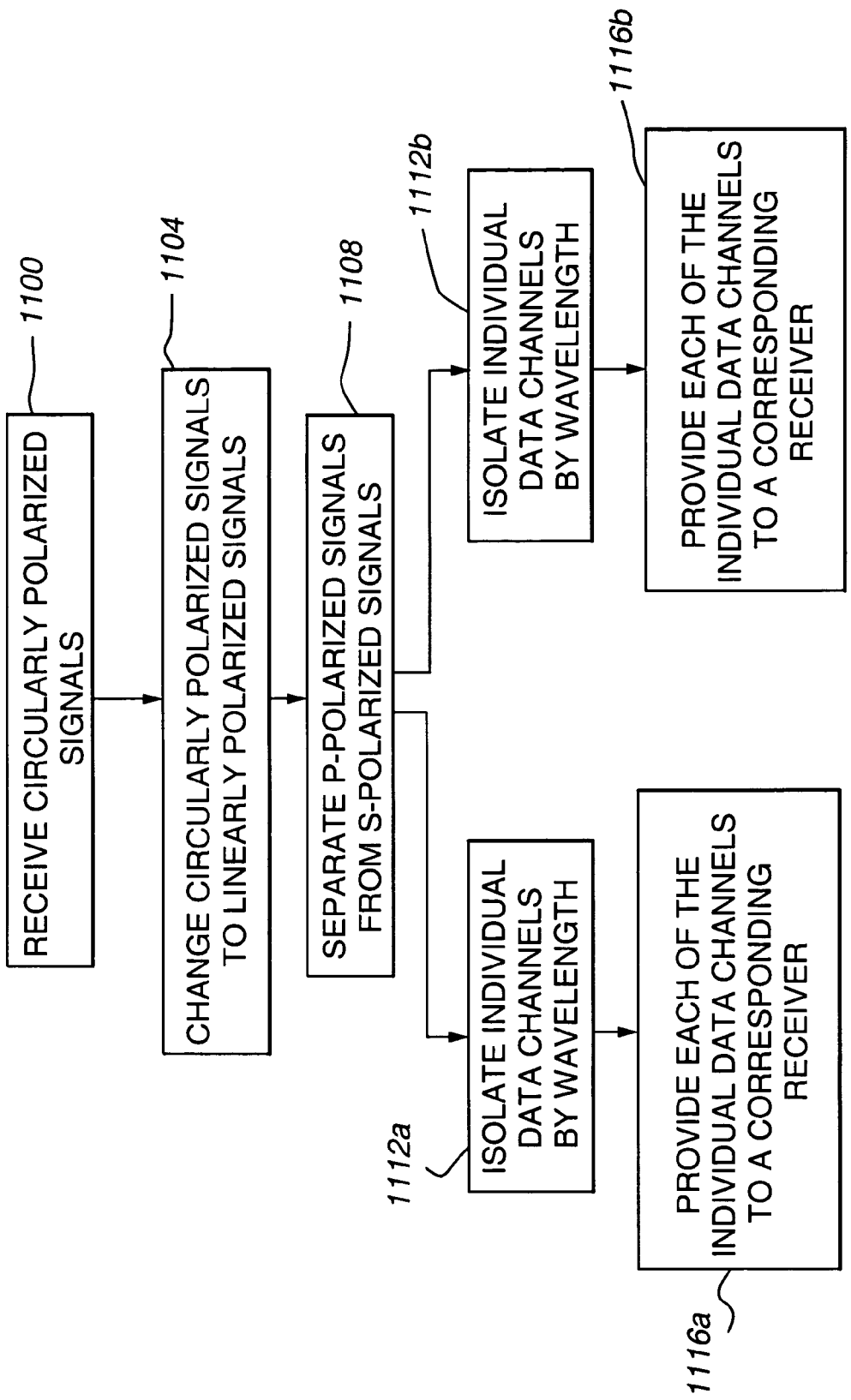
FIG. 11 is a flow chart depicting aspects of the operation of a multiple access space laser communication optical system in accordance with an embodiment of the present invention.

With reference now to FIG. 11, the operation of a multiple access space laser communication optical system 100 in accordance with an embodiment of the present invention in receiving multiplexed data channels is illustrated. Initially, at step 1100, circularly polarized signals are received by a multiple access communication device 104. The use of circularly polarized signals provides advantages in the production and detection of signals. As can be appreciated by one of skill in the art, each communication endpoint 108 is thus capable of generating and transmitting circularly polarized optical signals. At step 1104, the circularly polarized signals are changed to linearly polarized signals. At step 1108, a first demultiplexing of the received signals is performed. At step 1112a, the P-polarized signals are isolated according to wavelength. Separately, at step 1112b, the S-polarized signals are isolated according to wavelength. At step 1116a, each of the included signals or data channels are provided to a corresponding receiver. Similarly, at step 1116b, each of the individual signals or data channels are provided to a corresponding receiver. Accordingly, the present invention allows an initial division of signals to be made using differential polarization, and further divisions may be made based on differential signal wavelengths.

The operation of a multiple access space laser communication optical system 100 in accordance with an embodiment of the present invention in transmitting multiplexed data channels is generally the reverse of the operation illustrated in FIG. 11. In particular, a transmitter or light source for each data channel provides light (i.e. a signal) at a selected wavelength and having a selected polarization. Signals having like polarizations but different wavelengths are combined. The signals may then be combined with signals having a polarization that is orthogonal to the first, and provided to the telescope optical assembly 404 for transmission.

In accordance with an embodiment of the present invention, a multiple access space laser communication optical system 100 capable of both sending and receiving multiplexed optical signals through a single telescope optical assembly (i.e. a single telescope aperture) 404 divides the transmit and receive data channels between first and second circular polarizations. In particular, received data channels may all have a first circular polarization while traveling from communication endpoints 108 to a multiple access communication device 104, and may be separated from one another by wavelength. Transmitted data channels may have a second circular polarization while such signals are being transmitted across free space to endpoints 108, and may be combined with one another by a multi-access communication device 104.

Figure 12:
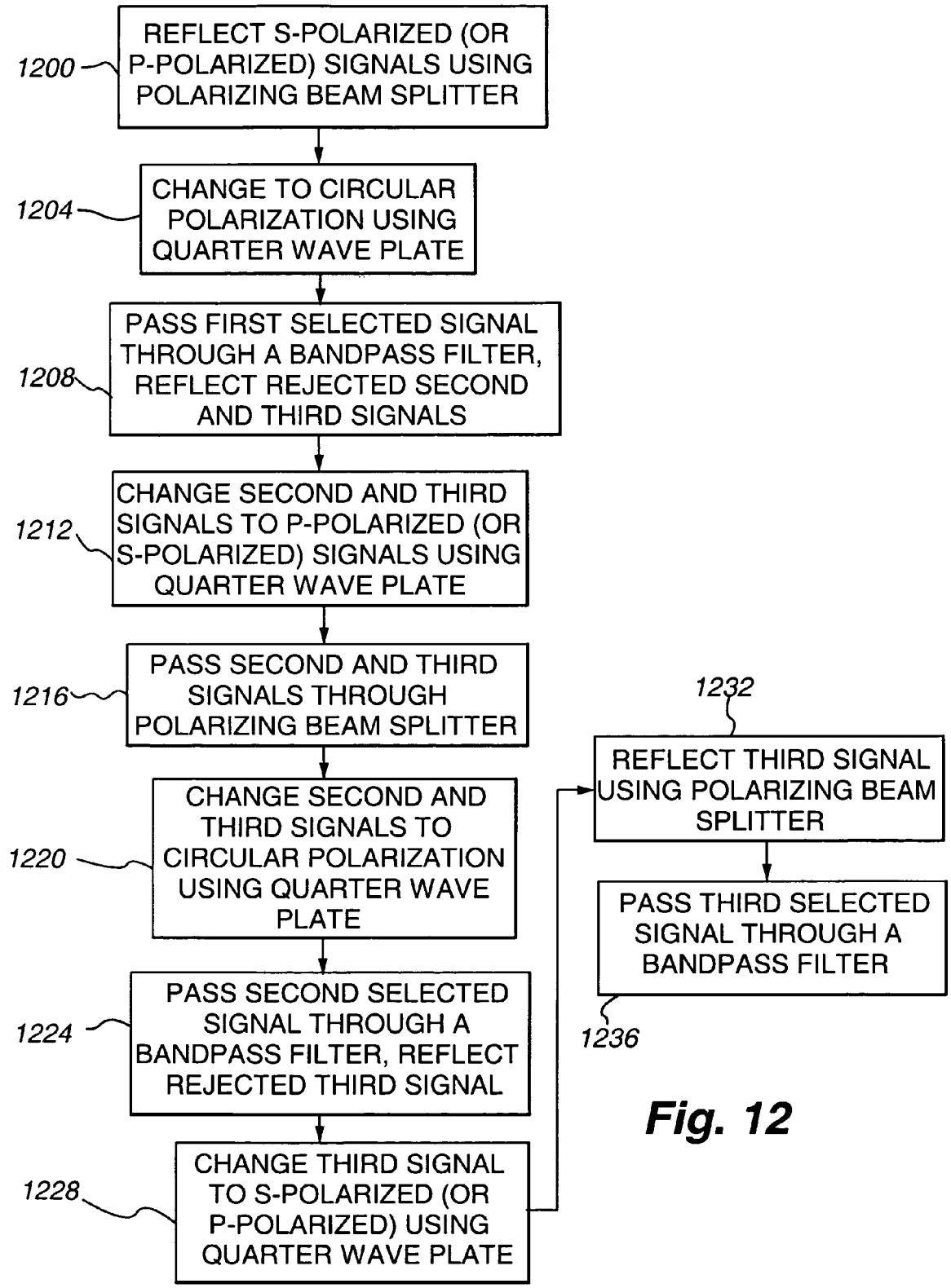
FIG. 12 is a flow chart depicting the demultiplexing of signals in accordance with an embodiment of the present invention.

With reference now to FIG. 12, the operation of a wavelength multiplexer/demultiplexer assembly 516, 520 using a reflect-transmit-reflect type architecture in accordance with an embodiment of the present invention in separating three multiplexed signals having different wavelengths and the same polarity is illustrated. Initially, at step 1200, the S-polarized (or alternatively P-polarized) signals are reflected using a polarizing beam splitter (e.g., first PBS 524). The reflected signals are changed to circular polarization using a quarter wave plate (e.g., first QWP 528) (step 1204). The circularly polarized light is substantially normal to a bandpass filter (e.g., first BPF 536), which allows a first selected signal having a first selected wavelength to pass, while reflecting rejected second and third signals (step 1208). The second and third signals are passed back through the quarter wave plate (e.g., first QWP 528), and emerge from the quarter wave plate as P-polarized (or S-polarized) signals (step 1212). The second and third signals are then passed by the polarizing beam splitter (e.g., first BPF 524) (step 1216).

At step 1220, the second and third signals are changed to circular polarization by passing those signals through a second quarter wave plate (e.g., second QWP 552). The now circularly polarized second and third signals are incident upon a second bandpass filter (e.g., second BPF 560). In particular, the bandpass filter is positioned so that the second and third signals are substantially normal to the bandpass filter. The second bandpass filter allows a second selected signal having a second wavelength to pass, and reflects the third signal (step 1224). The third signal is changed to S-polarized (or P-polarized) light by passing it back through the second quarter wave plate (e.g. second QWP 552) (step 1228). The third signal is then reflected using the polarizing beam splitter (e.g., first PBS 524) (step 1232).

At step 1236, the third signal, which has a third selected wavelength, is passed through a bandpass filter (e.g., third BPF 584) positioned such that the third signal is substantially normal to the bandpass filter. Any light having a wavelength outside of the passband of the third passband filter is reflected.

The operation of a wavelength multiplexer/demultiplexer assembly 516, 520 using a reflect-transmit-reflect architecture in connection with the multiplexing and transmission of a plurality of transmitted signals is, according to an embodiment of the present invention, generally the reverse of the operation illustrated in connection with FIG. 12. In particular, within an optical wavelength multiplexer/demultiplexer assembly 516 or 520, individual lasers or amplifiers are provided with circularly polarized output such that when the signals leave the first wavelength multiplexer/demultiplexer assembly 516 or second wavelength multiplexer/demultiplexer assembly 520 they each have the same selected polarity and different wavelengths. Using quarter wave plates, the beams of light can be selectively polarized, to selectively transmit or reflect the light using polarizing beam splitters. In addition, the configuration allows the beams to be maintained at angles that are substantially normal to provided bandpass filters, limiting the magnitude of wavelength shifts of the center of the passband which arise due to angle of incidence variation in the BPFs. The thus multiplexed signals are provided to the telescope optical assembly as light having a first selected polarity and comprising the wavelengths produced by the transmitters.

Figure 13:
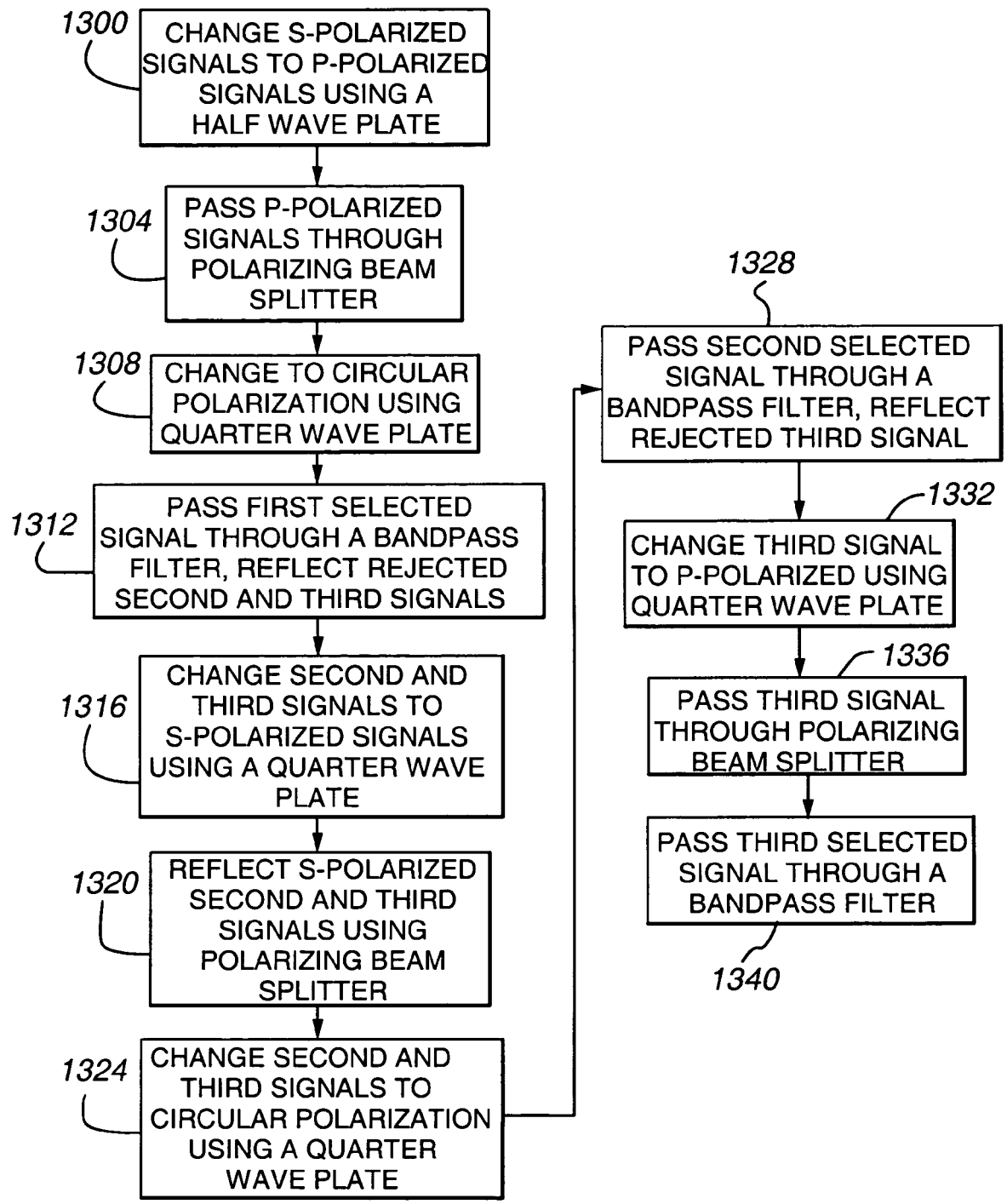
FIG. 13 is a flow chart depicting the demultiplexing of signals in accordance with another embodiment of the present invention.

With reference now to FIG. 13, the separation of three multiplexed signals having different wavelengths and the same polarity by a wavelength multiplexer/demultiplexer assembly 516, 520 using a transmit-reflect-transmit architecture in accordance with an embodiment of the present invention is illustrated. Initially, at step 1300, S-polarized signals are changed to P-polarized signals using a half wave plate (e.g., half wave plate 804 shown in FIG. 8). This step can be omitted where P-polarized signals are received at the wavelength multiplexer/demultiplexer assembly 516, 520. The P-polarized signals are then passed through a first polarizing beam splitter (e.g., first PBS 816)(step 1304).

The signals are changed to circular polarization using a quarter wave plate (e.g., first QWP 820) at step 1308. The circularly polarized light is substantially normal to a bandpass filter (e.g., first BPF 828) which allows a first selected signal having a first selected wavelength to pass, while reflecting rejected second and third signals (step 1312). The second and third signals are passed back through the quarter wave plate (e.g., first QWP 820), and emerge from the quarter wave plate as S-polarized signals (step 1316). The now S-polarized second and third signals are then reflected using the polarizing beam splitter (e.g., first PBS 816)(step 1320).

At step 1324, the second and third signals are changed to circular polarization by passing those signals through a second quarter wave plate (second QWP 840). The now circularly polarized second and third signals are incident upon and substantially normal to a second bandpass filter (e.g., second BPF 848). The second bandpass filter allows a second selected signal having a second wavelength to pass, and reflects the third signal (step 1328). The third signal is changed to P-polarized light by passing it back through the second quarter wave plate (e.g., second QWP 840)(step 1332). The third signal is then passed through the polarizing beam splitter (e.g., first PBS 816)(step 1336).

At step 1340, the third signal, which has a third selected wavelength, is passed through a bandpass filter (e.g., third BPF 860) positioned such that the third signal is substantially normal to the bandpass filter. Any light having a wavelength outside of the passband of the third bandpass filter is reflected.

As can be appreciated by one of skill in the art, the operation of a wavelength multiplexer/demultiplexer assembly 516, 520 using a transmit-reflect-transmit architecture to multiplex a plurality of signals for transmission is, according to an embodiment of the present invention, generally the reverse of the operation illustrated in connection with FIG. 13. In particular, individual lasers or amplifiers are provided such that when the signals leave the first wavelength multiplexer/demultiplexer assembly 516 or second wavelength multiplexer/demultiplexer assembly 520, they each have the same select polarity and different wavelengths. Using quarter wave plates and double-pass reflection through the quarter wave plates, the beams of light can be selectively polarized, to selectively transmit or reflect the light using polarizing beam splitters. In addition, the configuration allows the beams to be maintained at angles that are substantially normal to provide a bandpass filter, limiting the magnitude of wavelength shifts of the center of the passband which arise due to angle of incidence variations in the BPFs. The thus multiplexed signals are provided to the telescope optical assemblies light having a first selected polarity and comprising the wavelengths produced by the transmitters.

It should also be appreciated by one of skill in the art that a transmit-reflect-transmit architecture using polarizing beam splitters that reflect P-polarized light and that transmit S-polarized light could also be implemented.

Figure 14:
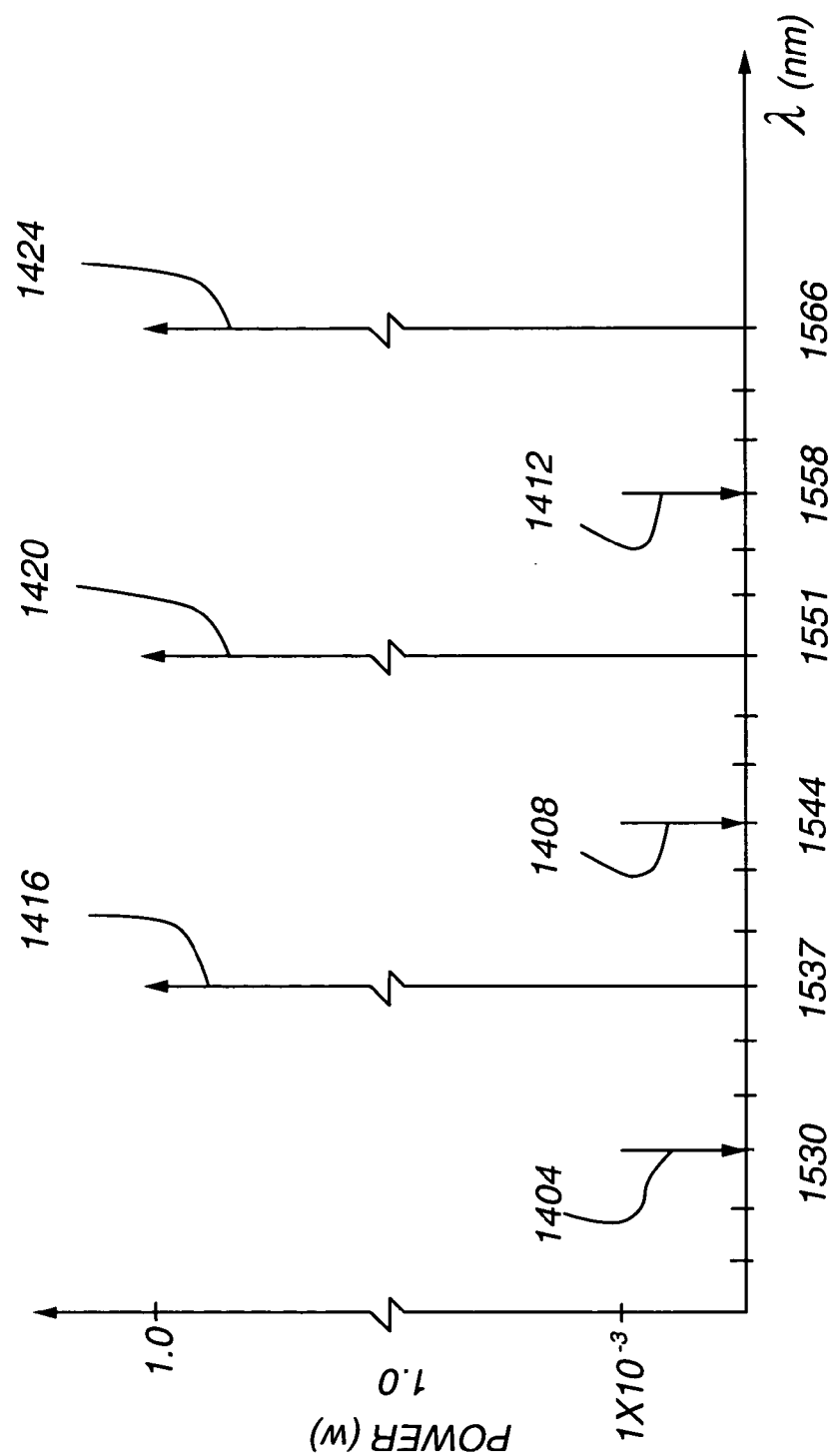
FIG. 14 is a graph depicting the assignment of channels in accordance with an embodiment of the present invention.

With reference now to FIG. 14, a graph depicting the assignment of communication channels in accordance with an embodiment of the present invention is illustrated. In particular, channels associated with received signals 1404, 1408, 1412 having a first circular polarization when traveling in free space are interleaved with transmission channels 1416, 1420, 1424 having a second circular polarization while traveling in free space. The interleaving of channels 1404-1424 allows the available signal wavelengths to be used efficiently. Accordingly, in connection with a telescope optical assembly 404 and associated optical signal multiplexers/demultiplexers 408 dedicated to either transmission or reception, the separation between channels within the telescope optical assembly 404 and optical signal multiplexer/demultiplexer 408 is twice what it would otherwise be, thus allowing a greater centerband wavelength shift to be accommodated. In connection with a telescope optical assembly 404 and associated optical signal multiplexers/demultiplexers that both transmit and receive signals, interleaving allows more channels for a given wavelength spacing between channels. In particular, by having alternately circularly polarized channels, the bandpass filters of the wavelength multiplexer/demultiplexer assemblies 516, 520 need only demultiplex channels that are spaced by $\Delta\lambda$ (in units of nm for example), where $\Delta\lambda=2BW/(N-1)$, and where BW is the total wavelength range (bandwidth), and N is the number of channels. Accordingly, the wavelength multiplexer/demultiplexer assemblies 516, 520 are not required to separate channels that are as close in wavelength as for a multiple access communication device 104 supporting a like number of channels but in which channels of different polarization were not interleaved, in which case $\Delta\lambda=BW/(N-1)$, Also, note that channels or signals 1416, 1420, 1424 may also represent one set of received signals of a certain circular polarization state and channels or signals 1404, 1408, 1412 another set of received signals of the orthogonal circular polarization in the case of a dual telescope. There is an analogous assignment for the transmit case of the dual telescope.

As noted above, bandpass filters are known to produce shifts in the wavelength of the transmitted signals that are not normal to the filter. In particular, multilayer dielectric BPFs produce a shift $\delta\lambda$ in their transmission peak due to a variation in the angle of incidence. In order to maintain a high throughput, it is necessary to keep $\delta\lambda<<\Delta\lambda$. For example, if BW=1565−1530 nm=35 nm and N=6, then $\delta\lambda<14$ nm. A typical filter will have $\delta\lambda\sim 8$ nm for an angle of incidence 11°, leaving ample margin for manufacturing and environmental tolerances.

In accordance with an embodiment of the present invention, the telescope optical assembly 404 has a field of view of 2°, and an entrance pupil (for example a primary mirror) having a diameter of 40 cm. To achieve 11° angle of incidence at the BPF the BPF diameter must be at least 36 mm. Provided channels are alternately circularly polarized, and adjacent channels are spaced by 7 nm, thus requiring the wavelength multiplexer/demultiplexer assemblies 516, 520 to each separate channels that are spaced by 14 nm.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A multiple access optical communication device, comprising:
    an optical signal multiplexer/demultiplexer operable to at least one of multiplex and demultiplex optical signals, including:
        a primary optical signal polarization discriminator, including:
            a primary polarizing beam splitter defining two signal transmission paths;
        a first wavelength discriminator assembly, including:
            a first polarizing beam splitter located within a first of said two signal transmission paths but not within a second of said two signal transmission paths;
            a first quarter wave plate, wherein said first quarter wave plate is located within a transmission path of said light reflected by said first polarizing beam splitter; and
            a first bandpass filter, wherein said first bandpass filter is substantially normal to said transmission path of said light reflected by said first polarizing beam splitter, wherein said first bandpass filter receives light from said first quarter wave plate, wherein light having a wavelength within a passband of said first bandpass filter is passed as a first communication channel, and wherein light having a wavelength outside of said passband of said first bandpass filter is reflected;
        a second quarter wave plate, wherein light reflected by said first bandpass filter is transmitted by said first polarizing beam splitter and is incident upon and transmitted by said second quarter wave plate; and a second bandpass filter, wherein said second bandpass filter is substantially normal to a transmission path of said light reflected by said first bandpass filter, wherein light having a wavelength within a passband of said second bandpass filter is passed as a second communication channel, and wherein light having a wavelength outside of said passband of said second bandpass filter is reflected.

2. The device of claim 1, further comprising:
    a telescope optical assembly, operable to at least one of receive and transmit optical signals.

3. The device of claim 2, wherein said telescope optical assembly receives optical signals, and wherein received optical signals are provided to said optical signal multiplexer/demultiplexer.

4. The device of claim 2, wherein said telescope optical assembly transmits optical signals, and wherein said telescope optical assembly receives optical signals for transmission from said optical signal multiplexer/demultiplexer.

5. The device of claim 1, further comprising:
    a first optical signal transceiver, wherein a signal having a first wavelength is at least one of received from or provided to said first wavelength discriminator assembly by said first optical signal transceiver; and
    a second optical signal transceiver wherein a signal having a second wavelength is at least one of received from or provided to said first wavelength discriminator assembly by said second optical signal transceiver.

6. The device of claim 5, wherein said first optical signal transceiver comprises a light source.

7. The device of claim 5, wherein said first optical transceiver comprises an optical receiver.

8. The device of claim 5, wherein said first optical transceiver comprises an optical receiver and wherein said second optical transceiver comprises a light source.

9. The system of claim 5, further comprising:
    a first mirror, operable to selectively steer a first signal towards a boresight of said first optical transceiver, wherein said first mirror has a first effective range of motion;

a second mirror, operable to selectively steer said first signal towards said boresight of said first optical transceiver, wherein said second mirror has a second effective range of motion.

10. The system of claim 5, further comprising:
a first mirror, operable to selectively steer a first signal towards a boresight of said first optical transceiver, wherein said first mirror has a first effective range of motion; and
a second mirror, operable to remove jitter with respect to a plurality of signals, wherein said second mirror has a second effective range of motion and wherein said plurality of signals includes said first signal.

11. The device of claim 10, further comprising:
a telescope optical assembly having substantially zero angular distortion.

12. The device of claim 1, further comprising a second wavelength discriminator assembly.

13. The device of claim 12, wherein said second wavelength discriminator assembly includes:
a first polarizing beam splitter operable to transmit light having a first polarization and to reflect light having a second polarization;
a first quarter wave plate, wherein said first quarter wave plate is located within a transmission path of said light reflected by said first polarizing beam splitter; and
a first bandpass filter, wherein said first bandpass filter is substantially normal to said transmission path of said light reflected by said first polarizing beam splitter, wherein said first bandpass filter receives light from said first quarter wave plate, wherein light having a wavelength within a passband of said bandpass filter is passed as a first single communication channel, and wherein light having a wavelength outside of said passband of said first bandpass filter is reflected.

14. The device of claim 12, further comprising:
a first optical signal transceiver, wherein a signal that is received from a first one of said first wavelength discrimination assembly and said second wavelength discrimination assembly is received by said first optical signal transceiver; and
a second optical signal transceiver, wherein a signal is provided to a second one of said first wavelength discrimination assembly and said second wavelength discrimination assembly by said second optical signal transceiver.

15. The device of claim 14, further comprising:
a single telescope optical assembly.

16. The device of claim 1, wherein said primary optical signal polarization discriminator further comprises:
a primary linear polarization retarder.

17. The device of claim 16, wherein said primary linear polarization retarder comprises a quarter wave plate.

18. The device of claim 1, further comprising a second wavelength discriminator assembly, wherein said first wavelength discriminator assembly receives light having a first polarization from or provides light having a first polarization to said primary optical signal polarization discriminator, and wherein said second wavelength discriminator assembly receives light having a second polarization from or provides light having a second polarization to said primary optical signal polarization discriminator.

19. The device of claim 1, wherein said first wavelength discriminator assembly further comprises:
a half wave plate located along said first transmission path and between said primary optical signal polarization discriminator and said first polarizing beam splitter.

20. The device of claim 1, wherein said first wavelength discriminator assembly further comprises:
a third bandpass filter, wherein said third bandpass filter receives said light reflected by said second bandpass filter and by said first polarizing beam splitter, wherein said third bandpass filter is substantially normal to a transmission path of said light reflected by said first polarizing beam splitter, and wherein light having a wavelength within a passband of said third bandpass filter is passed as a third communication channel.

21. The device of claim 1, wherein said optical signal multiplexer/demultiplexer is provided as part of a communication satellite.

22. A multiple access optical communication device, comprising:
an optical signal multiplexer/demultiplexer operable to at least one of multiplex and demultiplex optical signals, including:
a primary optical signal polarization discriminator; and
a first wavelength discriminator assembly, wherein signals having a first polarization and a different wavelength are at least one of:
a) received from said first optical signal polarization discriminator assembly and separated, and
b) combined and provided to said first optical signal polarization discriminator;
wherein said first wavelength discriminator assembly comprises:
a first polarizing beam splitter located within a first transmission path of signals at least one of transmitted to and received from said primary optical signal polarization discriminator assembly and operable to reflect light having a first polarization and to transmit light having a second polarization;
a first quarter wave plate, wherein said first quarter wave plate is located within a transmission path of said light reflected by said first polarizing beam splitter;
a first bandpass filter, wherein said first bandpass filter is substantially normal to said transmission path of said light reflected by said first polarizing beam splitter, wherein said first bandpass filter receives light from said first quarter wave plate, wherein light having a wavelength within a passband of said first bandpass filter is passed as a first communication channel, and wherein light having a wavelength outside of said passband of said first bandpass filter is reflected;
a second quarter wave plate, wherein light reflected by said first bandpass filter is transmitted by said first polarizing beam splitter and is incident upon and transmitted by said second quarter wave plate;
a second bandpass filter, wherein said second bandpass filter is substantially normal to a transmission path of said light reflected by said first bandpass filter, wherein light having a wavelength within a passband of said second bandpass filter is passed as a second communication channel, and wherein light having a wavelength outside of said passband of said second bandpass filter is reflected;
wherein said light reflected by said second bandpass filter is reflected by said first polarizing beam splitter, and wherein said first wavelength discriminator assembly further comprises:
a second polarizing beam splitter operable to reflect light having said first polarization and to reflect light having said second polarization, wherein said second polarizing beam splitter receives light reflected by said second bandpass filter and by said first polarizing beam splitter, and wherein said second polarizing beam splitter reflects said light;
a third quarter wave plate, wherein said third quarter wave plate is located within a transmission path of said light reflected by said second polarization beam splitter; and
a third bandpass filter, wherein said third bandpass filter receives said light reflected by said second polarizing beam splitter and transmitted by said third quarter wave plate, wherein said third bandpass filter is substantially normal to a transmission path of said light reflected by said second polarizing beam splitter, wherein light having a wavelength within a passband of said third bandpass filter is passed as a third single communication channel, and wherein light having a wavelength outside of said passband of said third bandpass filter is reflected.

23. A multiple access optical communication device, comprising:
an optical signal multiplexer/demultiplexer operable to at least one of multiplex and demultiplex optical signals, including:
a primary optical signal polarization discriminator; and
a first wavelength discriminator assembly, wherein signals having a first polarization and a different wavelength are at least one of:
a) received from said first optical signal polarization discriminator assembly and separated, and
b) combined and provided to said first optical signal polarization discriminator;
wherein said first wavelength discriminator assembly comprises:
a first polarizing beam splitter located within a first transmission path of signals at least one of transmitted to and received from said primary optical signal discriminator and operable to reflect light having a first polarization and to transmit light having a second polarization;
a first quarter wave plate, wherein said first quarter wave plate is located within a transmission path of said light transmitted by said first polarizing beam splitter; and
a first bandpass filter, wherein said first bandpass filter is substantially normal to said transmission path of said light transmitted by said first polarizing beam splitter, wherein said first bandpass filter receives light from said first quarter wave plate, wherein light having a wavelength within a passband of said first bandpass filter is passed as a first communication channel, and wherein light having a wavelength outside of said passband of said first bandpass filter is reflected;
a second quarter wave plate, wherein light reflected by said first bandpass filter is reflected by said first polarizing beam splitter and is incident upon and transmitted by said second quarter wave plate; and
a second bandpass filter, wherein said second bandpass filter is substantially normal to a transmission path of said light reflected by said first bandpass filter and said first polarizing beam splitter, wherein light having a wavelength within a passband of said second bandpass filter is passed as a second communication channel, and wherein light having a wavelength outside of said passband of said second bandpass filter is reflected.

24. The device of claim 23, wherein said first wavelength discriminator assembly further comprises:
a third bandpass filter, wherein said third bandpass filter receives said light reflected by said second bandpass filter after said light reflected by said second bandpass filter has been transmitted by said first polarizing beam splitter, wherein said third bandpass filter is substantially normal to a transmission path of said light reflected by said second quarter wave plate and transmitted by said first polarizing beam splitter, and where light having a wavelength within a passband of said third bandpass filter is passed as a third communication channel.

25. A method for providing a multiple access optical communication system, comprising:
receiving at a first optical assembly a first signal comprising a number of data channels and comprising light having a first circular polarization;
transforming said first circular polarization of said first signal into a first linear polarization; and
first reflecting in a first polarizing beam splitter said first signal having a first linear polarization;
second reflecting in a second polarizing beam splitter said first signal;
transforming said first linear polarization of said first signal into one of said first circular polarization and a second circular polarization;
after transforming said first linear polarization of said first signal into one of said first circular polarization and a second circular polarization, passing light included in said first signal within at least a first range of wavelengths through a first bandpass filter and reflecting light included in said first signal within at least a second range of wavelengths using said first bandpass filter;
providing said light passed by said first bandpass filter to a first detector;
transforming said light reflected by said first bandpass filter into one of said first linear polarization and a second linear polarization;
after transforming said light reflected by said first bandpass filter into one of said first linear polarization and a second linear polarization, passing said light through said second polarizing beam splitter;
transforming said light passed through said second polarizing beam splitter into one of said first circular polarization and said second circular polarization.

26. The method of claim 25, further comprising:
receiving at said first optical assembly a second signal comprising a number of data channels and comprising light having a second frequency and a second circular polarization; and
transforming said second circular polarization of said second signal into a second linear polarization.

27. The method of claim 26, further comprising:
transforming said second linear polarization of said second signal into a circular polarization;
separating light having a second wavelength from said second signal;
transforming said circular polarization of said second signal into said first linear polarization.

28. The method of claim 25, further comprising:
providing light having a second circular polarization to said first optical assembly; and
transmitting from said first optical assembly said light having a second circular polarization.

29. The method of claim 25, wherein said step of receiving at a first optical assembly a first signal comprises a first step of receiving, and wherein a ray associated with said first signal has a first angle with respect to said first optical assembly, said method further comprising:

a second step of receiving at said first optical assembly said first signal, wherein said first signal has a second angle with respect to said first optical assembly.

30. The method of claim 25, further comprising:

after transforming said light passed through said second polarizing beam splitter into one of said first circular polarization and said second circular polarization, passing light included in said first signal within at least a third range of wavelengths through a second bandpass filter and reflecting light included in said first signal within at least a fourth range of wavelengths;

providing said light passed by said second bandpass filter to a second detector;

transforming said light reflected by said second bandpass filter into one of said first linear polarization and said second linear polarization;

after transforming said light reflected by said second bandpass filter into one of said first linear polarization and said second linear polarization, third reflecting in said second polarizing beam splitter said first signal, wherein said first signal is without said light within said first, second or third ranges of wavelengths.

* * * * *